(12) United States Patent
Hayashi

(10) Patent No.: US 7,092,023 B2
(45) Date of Patent: Aug. 15, 2006

(54) MOVING IMAGE REPRODUCING DEVICE EQUIPPED WITH MULTI-IMAGE PLAYBACK FUNCTION

(75) Inventor: Tetsuya Hayashi, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 645 days.

(21) Appl. No.: 10/122,663

(22) Filed: Apr. 15, 2002

(65) Prior Publication Data

US 2002/0154238 A1   Oct. 24, 2002

(30) Foreign Application Priority Data

Apr. 20, 2001   (JP) ............... 2001-122700

(51) Int. Cl.
 $H04N\ 5/222$   (2006.01)
(52) U.S. Cl. ............... 348/333.05; 348/231.99
(58) Field of Classification Search ...............
 348/333.01–333.13, 231.99–231.9, 220.1,
 348/222.1, 143, 150–159, 564–565, 559,
 348/443, 722, 372, 552; 709/233, 231; 713/320
See application file for complete search history.

(56) References Cited

U.S. PATENT DOCUMENTS

| | | | |
|---|---|---|---|
| 6,172,712 B1 * | 1/2001 | Beard | 348/552 |
| 6,457,057 B1 * | 9/2002 | Kageyu et al. | 709/231 |
| 6,549,948 B1 * | 4/2003 | Sasaki et al. | 709/233 |
| 6,691,236 B1 * | 2/2004 | Atkinson | 713/320 |

FOREIGN PATENT DOCUMENTS

| | | |
|---|---|---|
| JP | 10-98667 A | 4/1998 |
| JP | 10-145724 A | 5/1998 |
| JP | 10-187760 A | 7/1998 |
| JP | 10-304299 A | 11/1998 |

* cited by examiner

*Primary Examiner*—Tuan Ho
*Assistant Examiner*—Brian Jelinek
(74) *Attorney, Agent, or Firm*—Frishauf, Holtz, Goodman & Chick, P.C.

(57) ABSTRACT

A moving image reproducing device is disclosed which comprises a flash memory for recording a plurality of items of moving image data, a display unit for displaying moving image data recorded in the memory, and a CPU for allowing a plurality of items of moving image data recorded in the memory to be reproduced simultaneously on the display unit. The CPU is adapted to, in order to keep the end of movie playback of each of the plurality of items of moving image data in time coincidence, delay the start time of movie playback of moving image data other than the moving image data which is the longest in playback time.

10 Claims, 19 Drawing Sheets

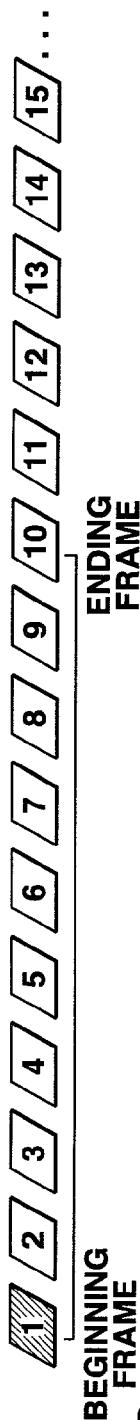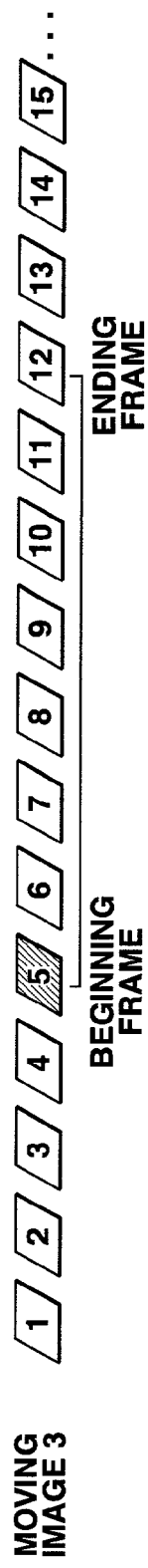

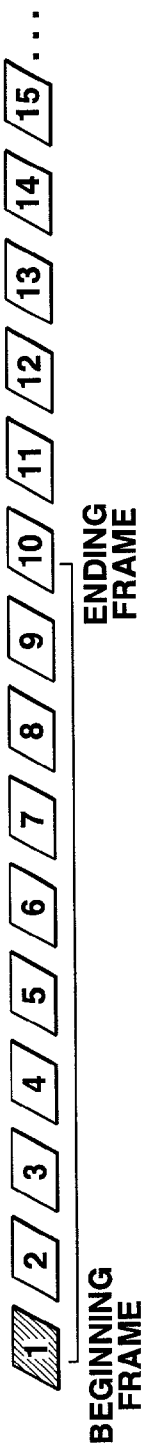
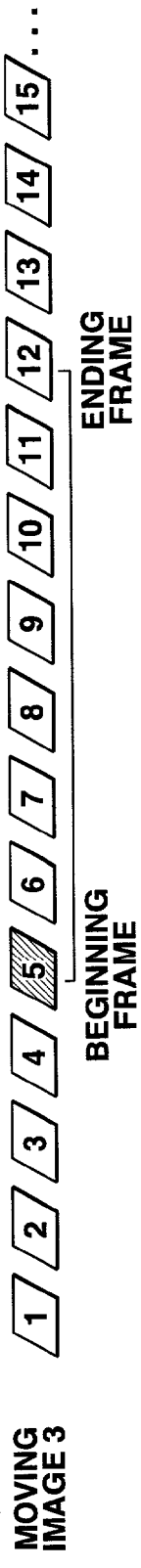
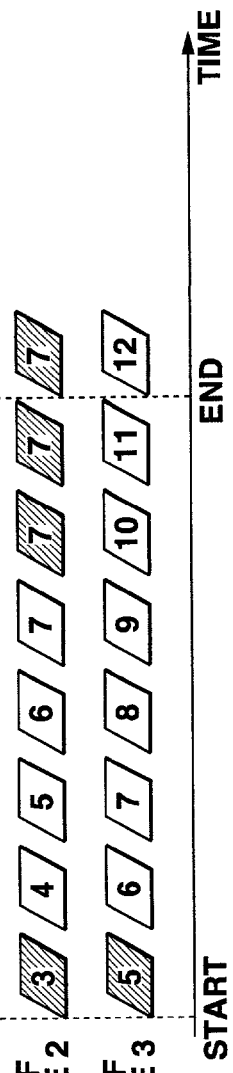

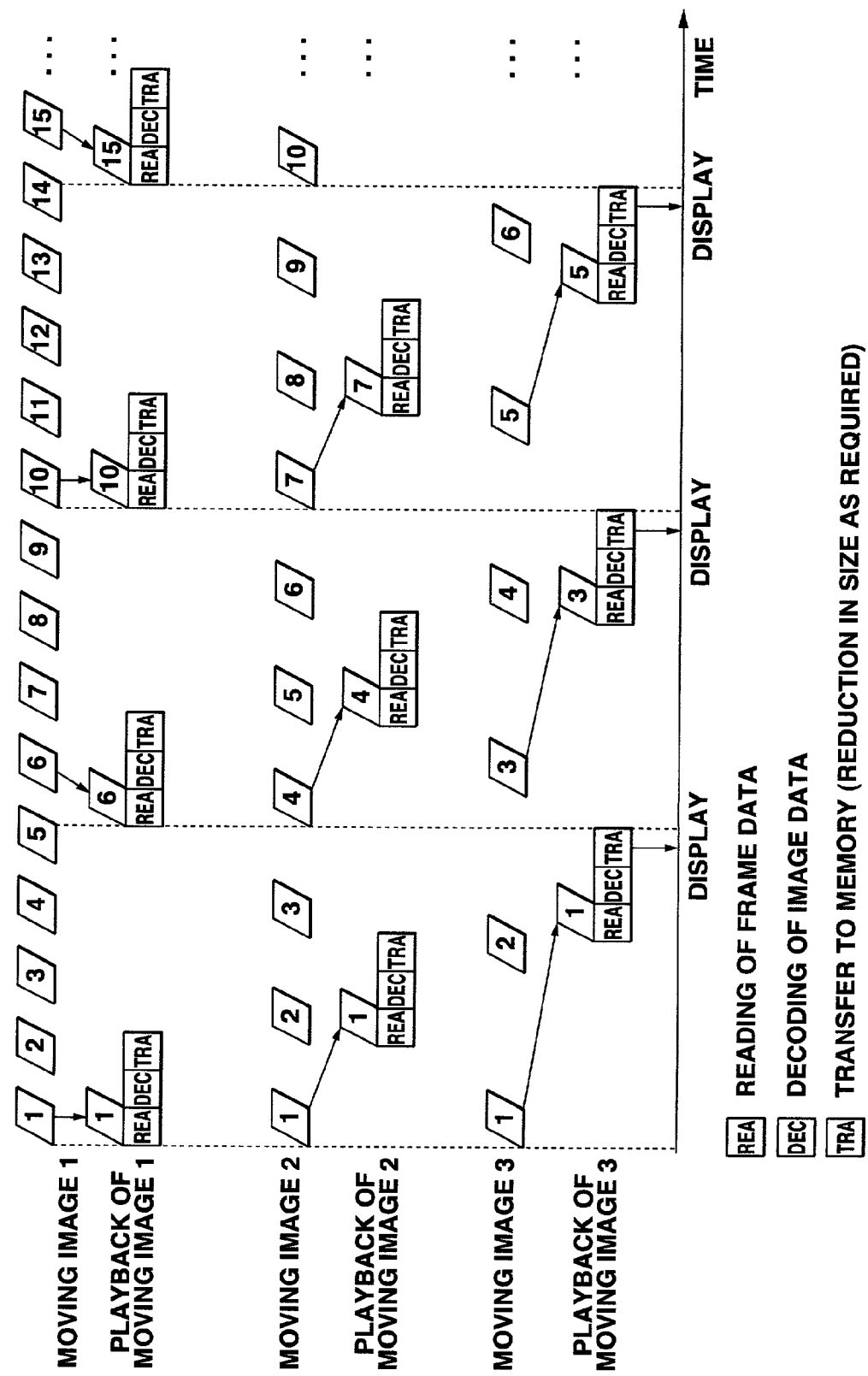

MOVING IMAGE REPRODUCING DEVICE EQUIPPED WITH MULTI-IMAGE PLAYBACK FUNCTION

CROSS-REFERENCE TO RELATED APPLICATIONS

This application is based upon and claims the benefit of priority from the prior Japanese Patent Application No. 2001-122700, filed Apr. 20, 2001, the entire contents of which are incorporated herein by reference.

BACKGROUND OF THE INVENTION

1. Field of the Invention

The present invention relates to a moving image reproducing device and method which allow playback of moving images.

2. Description of the Related Art

In recent years, in addition to digital video cameras, there have been commercially available many digital cameras that are capable of recording a moving image data file consisting of consecutive still images shot in time sequence on a memory card comprised of, say, a flash memory and reproducing the moving image data file recorded on the memory card.

Some of these digital cameras have a so-called multi-image display function built in, by which two or more still images recorded on the memory card are selected and then reproduced (displayed) simultaneously on the screen of the display unit at the back of the camera; however, none of them are adapted to simultaneously reproduce two or more moving image files recorded on a memory card.

BRIEF SUMMARY OF THE INVENTION

According to an aspect of the present invention, there is provided a moving image reproducing device comprising: a memory for recording a plurality of items of moving image data; a display unit for displaying moving image data recorded in the memory; and a processor for causing a plurality of items of moving image data recorded in the memory to be reproduced simultaneously on the display unit, the processor being adapted to, in order to keep the end of movie playback of each of the plurality of items of moving image data in time coincidence, delay the start time of movie playback of moving image data other than the moving image data which is the longest in playback time.

According to another aspect of the present invention, there is provided a moving image reproducing device comprising: a memory for recording three or more items of moving image data; a display unit for displaying moving image data recorded in the memory; and a processor for allowing three or more items of moving image data recorded in the memory to be reproduced simultaneously on the display unit, the processor being adapted to start movie playback of the three or more items of moving image data and then stop the movie playback of the moving image data at the time when the number of items of moving image data whose movie playback is not yet complete is reduced to one.

According to still another aspect of the present invention, there is provided a moving image reproducing device comprising: a memory for recording a plurality of items of moving image data each having a different frame rate; a display unit for displaying moving image data recorded in the memory; and a processor for allowing two or more items of moving image data different in frame rate recorded in the memory to be reproduced simultaneously on the display unit, the processor being adapted to change the frame rate of at least one of the two or more items of moving image data in order to reproduce simultaneously the two or more items of moving image data different in frame rate on the display unit.

According a further aspect of the present invention, there is provided a moving image reproducing device comprising: a memory for recording a plurality of items of moving image data; a display unit for displaying moving image data recorded in the memory; and a processor for causing two or more items of moving image data recorded in the memory to be reproduced simultaneously on the display unit, the processor being adapted to reproduce simultaneously the two or more items of moving image data on the display unit by selectively discarding frames in moving image data according to the time required to reproduce one frame of image in the moving image data.

According to a still further aspect of the present invention, there is provided a method of reproducing moving image data on a display unit comprising the steps of: displaying a plurality of items of moving image data recorded in a memory simultaneously on a display unit; and delaying the start time of movie playback of moving image data other than the moving image data which is the longest in playback time in order to keep the end of movie playback of each of the plurality of items of moving image data in time coincidence.

According to another aspect of the present invention, there is provided a method of reproducing moving image data on a display unit comprising the steps of: reproducing simultaneously three or more items of moving image data recorded in a memory; and after the start of movie playback of the three or more items of moving image data, stopping the movie playback of the moving image data at the time when the number of items of moving image data whose movie playback is not yet complete is reduced to one.

According to still another aspect of the present invention, there is provided a method of reproducing moving image data on a display unit comprising the steps of: reproducing simultaneously two or more items of moving image data different in frame rate recorded in the memory on the display unit; and changing the frame rate of at least one of the two or more items of moving image data in order to reproduce simultaneously the two or more items of moving image data different in frame rate on the display unit.

BRIEF DESCRIPTION OF THE SEVERAL VIEWS OF THE DRAWING

FIGS. 4A to 4D are diagrams for use in explanation of the way in which three moving images are reproduced simultaneously in accordance with the first embodiment of the present invention;

FIGS. 7A to 7D are diagrams for use in explanation of the way in which three moving images are reproduced simultaneously in accordance with the second embodiment of the present invention;

FIG. 19 is a diagram for use in explanation of the way in which three moving images are reproduced simultaneously in accordance with the sixth embodiment of the present invention.

DETAILED DESCRIPTION OF THE INVENTION

The present invention will be described hereinafter in terms of a specific application to a digital camera.

FIRST EMBODIMENT

Figure 1:
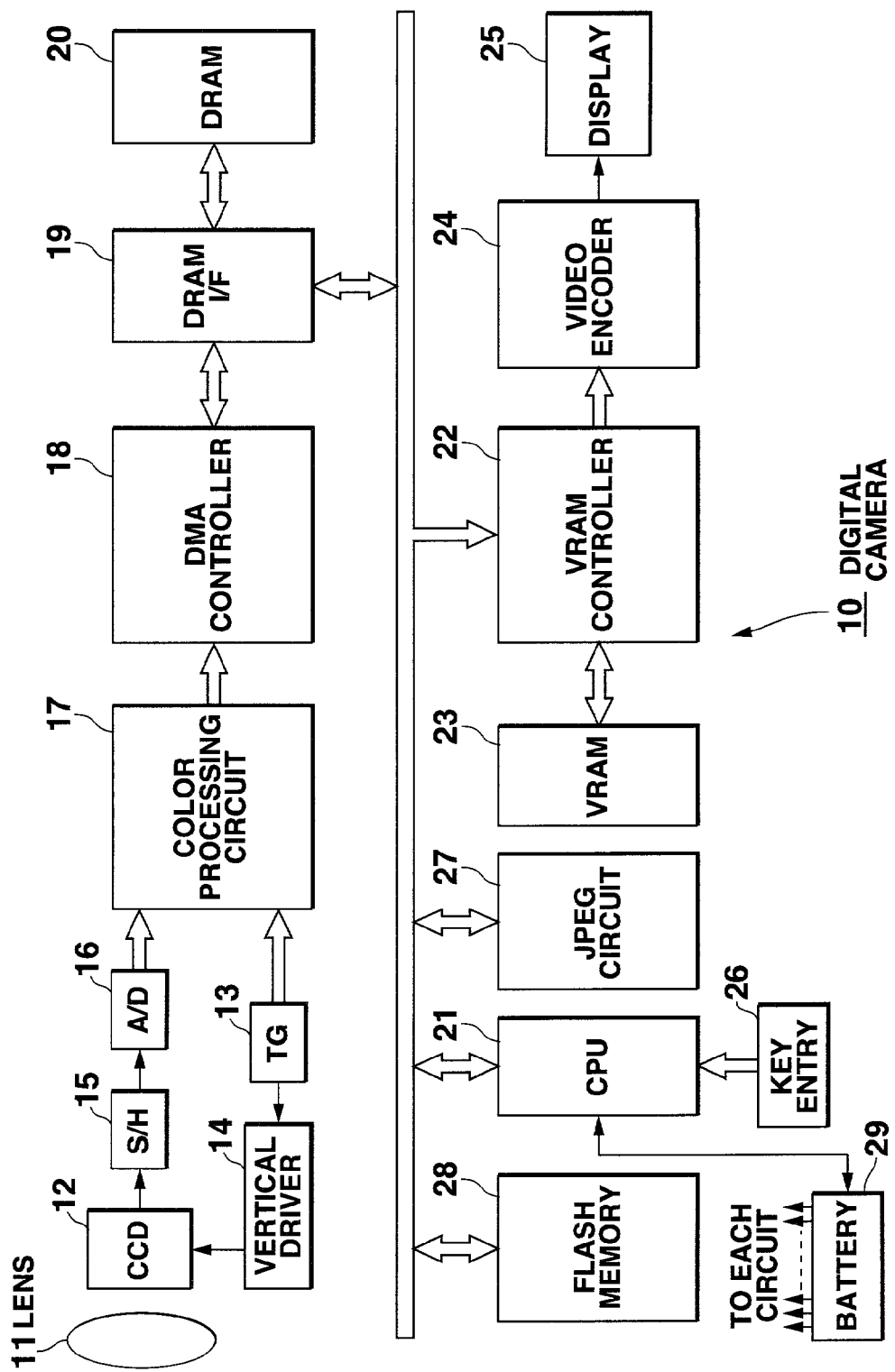
FIG. 1 is a block diagram of a digital camera to which the present invention is applied.

FIG. 1 shows the configuration of the digital camera, which is indicated at 10. The digital camera 10 has a record mode and a reproduce mode. In the record mode, a CCD 12 placed behind a lens 11 is scanned by a timing generator (TG) 13 and a vertical driver 14 to output an electrical signal for one image at regular intervals.

The CCD output signal, which is in analog form, is gain adjusted for each of RGB primary color components, then sampled and held in a sample and hold (S/H) circuit 15 and converted into digital form in an analog-to-digital (A/D) converter 16. The resulting digital signal is subjected to color processing including pixel interpolation in a color processing circuit 17 to produce a digital brightness signal Y and digital color difference signals Cb and Cr, which are in turn applied to a direct memory access (DMA) controller 18.

The DMA controller 18 then DMA transfers the brightness signal Y and the color difference signals Cb and Cr output from the color processing circuit 17 to a DMA area in a DRAM 20 via a DRAM interface (I/F) 19.

A CPU (processor) 21, which exercises control over the entire digital camera, reads the brightness and color difference signals from the DMA area in the DRAM 20 and then writes them through a VRAM controller 22 into a VRAM 23.

A digital video encoder (hereinafter abbreviated as a video encoder) 24 reads periodically the brightness and color difference signals from the VRAM 23 through the VRAM controller 22, then produces video signals based on these data and outputs them to a display unit 25.

The display unit 25, which is composed of, for example, a backlit color liquid crystal display panel and its associated driver circuit and placed at the back of the camera body, serves as an electronic view finder (EVF) in the record mode. In the record mode, the display unit displays a through image based on image information taken from the VRAM controller 22 through the video encoder 24.

In a state where an image is displayed as a monitor image on the display unit 25 in real time, when the shutter key out of a number of keys in a key entry unit 26 is operated at the instant of shooting that image, a trigger signal is generated.

When the digital camera has been placed in the still image capture mode, the CPU 21 is responsive to that trigger signal to DMA transfer brightness and color difference signals for one image captured by the CCD 12 at that time to the DRAM 20 and, immediately upon completion of the DMA transfer, turns off the path from the CCD to the DRAM. The CPU thus enters the recording state.

In the recording state, the CPU 21 reads the brightness and color difference signals from the DRAM 20 in units referred to as blocks of 8×8 pixels for each of Y, Cb and Cr components and writes them into a JPEG circuit 27, which provides data compression by the Huffman coding scheme which is an ADCT (Adaptive Discrete Cosine Transform) entropy coding scheme or the like.

The CPU 21 reads coded data resulting from the data compression from the JPEG circuit 27 as a data file and then writes it as a still image file into a flash memory 28 which is removably loaded into the digital camera as its recording medium.

When the moving image capture mode is set, after the DMA transfer of image signals to the DRAM 20 in response to a trigger signal, without shutting off the path from the CCD 12 to the DRAM 20 the CPU 21 reads brightness and color difference signals corresponding to one frame from the DRAM 20 in units of 8×8 blocks for each of Y, Cb and Cr components and writes them into the JPEG circuit 27 via the DRAM interface 19. In the JPEG circuit 27, the signals are compressed in the same manner as in the still image capture mode.

The CPU 21 reads coded data resulting from the data compression from the JPEG circuit 27 and then temporarily stores them into a storage area in the DRAM 20 via the DRAM interface 19.

The sequence of processes from the image capture by the CCD 12 to the storage of coded data into the DRAM 20 is processing on a still image corresponding to one frame in a moving image. Upon completion of this processing, the CPU 21 confirms that the shutter key is still operated and waits for the next image frame from the CCD 12.

While the shutter key is being operated, the CPU 21 repeats the same processing for each frame. Upon deciding that the shutter key has been released (or the DRAM 20 has become full), the CPU 21 assembles still image data for a plurality of frames stored in the DRAM 20 into moving image data in a predetermined format and transfers it to the flash memory 28 where it is stored as a moving image file together with information including parameter values.

In writing the moving image data into the flash memory 28, the CPU 21 creates new image data by selectively discarding a considerable number of constituent pixels of the first still image data in the moving image file and stores it as a preview image into the flash memory in association with the original moving image data.

Although the embodiment has been described as storing coded data for each still image from the JPEG circuit 27 in sequence into the DRAM 20, each still image data may be stored in sequence into the DRAM as it is uncompressed. In this case, upon judging that the shutter key has been released (or the DRAM has become full), the CPU subjects each still image data in the DRAM in sequence to data compression in the JPEG circuit and then writes the resulting coded image data into the flash memory.

Some of the moving image formats can set only one constant frame rate in one moving image data file. It becomes possible to reproduce moving image data at a constant frame rate by calculating the time required by a sequence of processes for each frame at the time of an operation of the shutter key and disabling image data captured by the CCD 12 from being transferred to the color process circuit 17 while each frame of still image data is being processed.

In this case, the time interval at which a request is made for transferring image data from the CCD 12 to the color process circuit 17 cannot be changed until the termination of writing of moving image data into the flash memory 28.

The key entry unit 26 includes, in addition to the shutter key, a recording/playback mode switching key for switching between the record (REC) mode and the playback (PLAY) mode, a mode key for making a selection from various capture modes, a cursor key for moving the cursor left, right, up, or down to select items on an image select or white balance select display screen, and an Enter key for determining selected items. Signals associated with key operations are directly sent to the CPU 21.

To reproduce still image data written into the flash memory 28 in the playback mode, the CPU 21 shuts off the path from the CCD 12 to the DRAM 20, then responds to the operation of the image select key in the key entry unit 26 to read coded data corresponding to a specific frame from the flash memory 28 into the JPEG circuit 27 and expand brightness and color difference signals corresponding to the specific frame in the VRAM 23 in units of 8×8 blocks as a result of decompression in the JPEG circuit.

The video encoder 24 produces video signals based on the brightness and color difference signals for one frame expanded in the VRAM 23. The video signals are then reproduced on the display unit 25.

The CPU 21 supplies power to all the circuits including the CPU 21. The CPU checks the remaining capacity of a battery 29 as the power supply of the digital camera at all times and, when judging that the battery power has been reduced considerably, restricts part of the operations of the digital camera.

The operation of the first embodiment will be described next.

Figure 2:
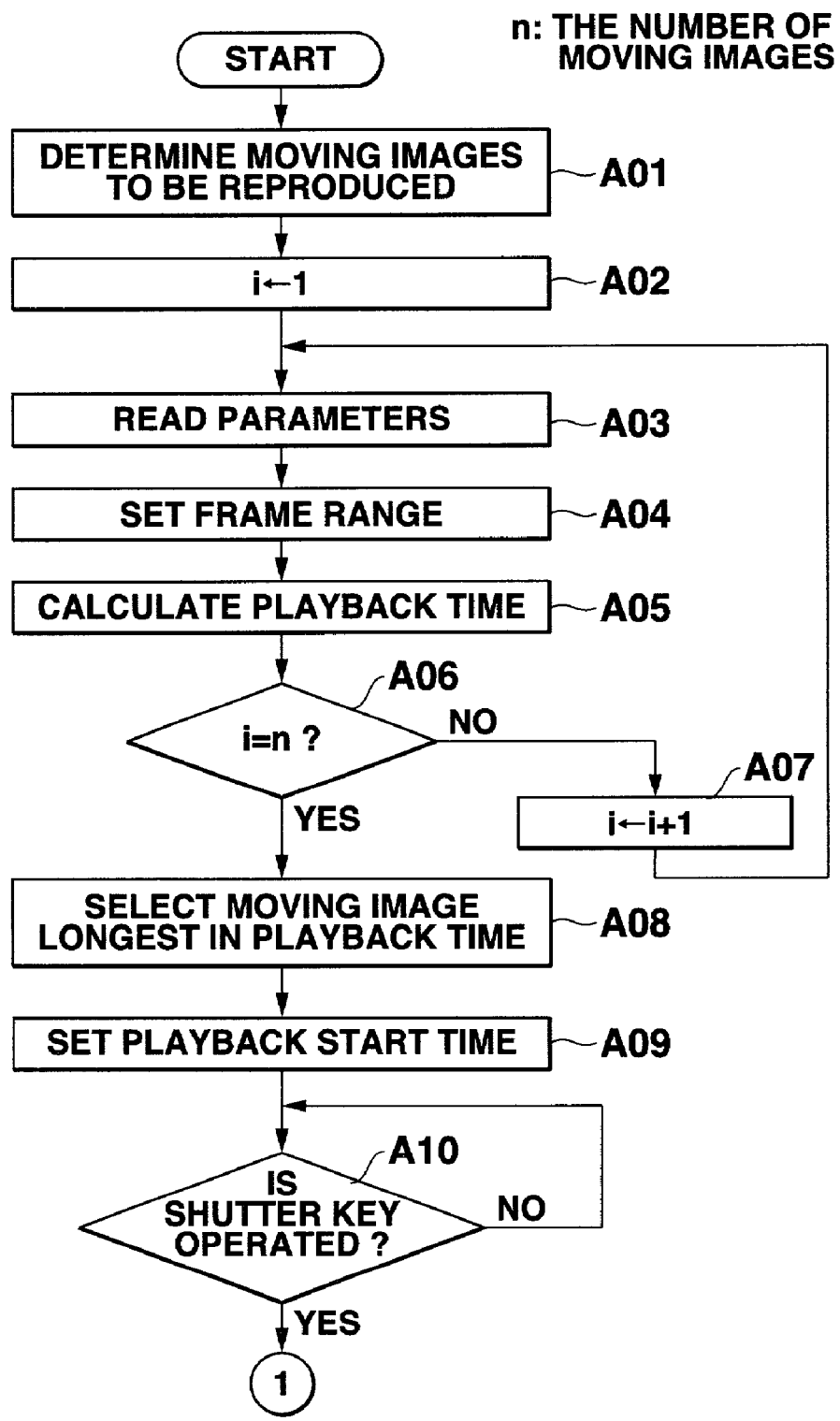
FIGS. 2 and 3 form a flowchart for the processing of reproducing two or more moving images simultaneously in accordance with a first embodiment of the present invention.
Figure 3:
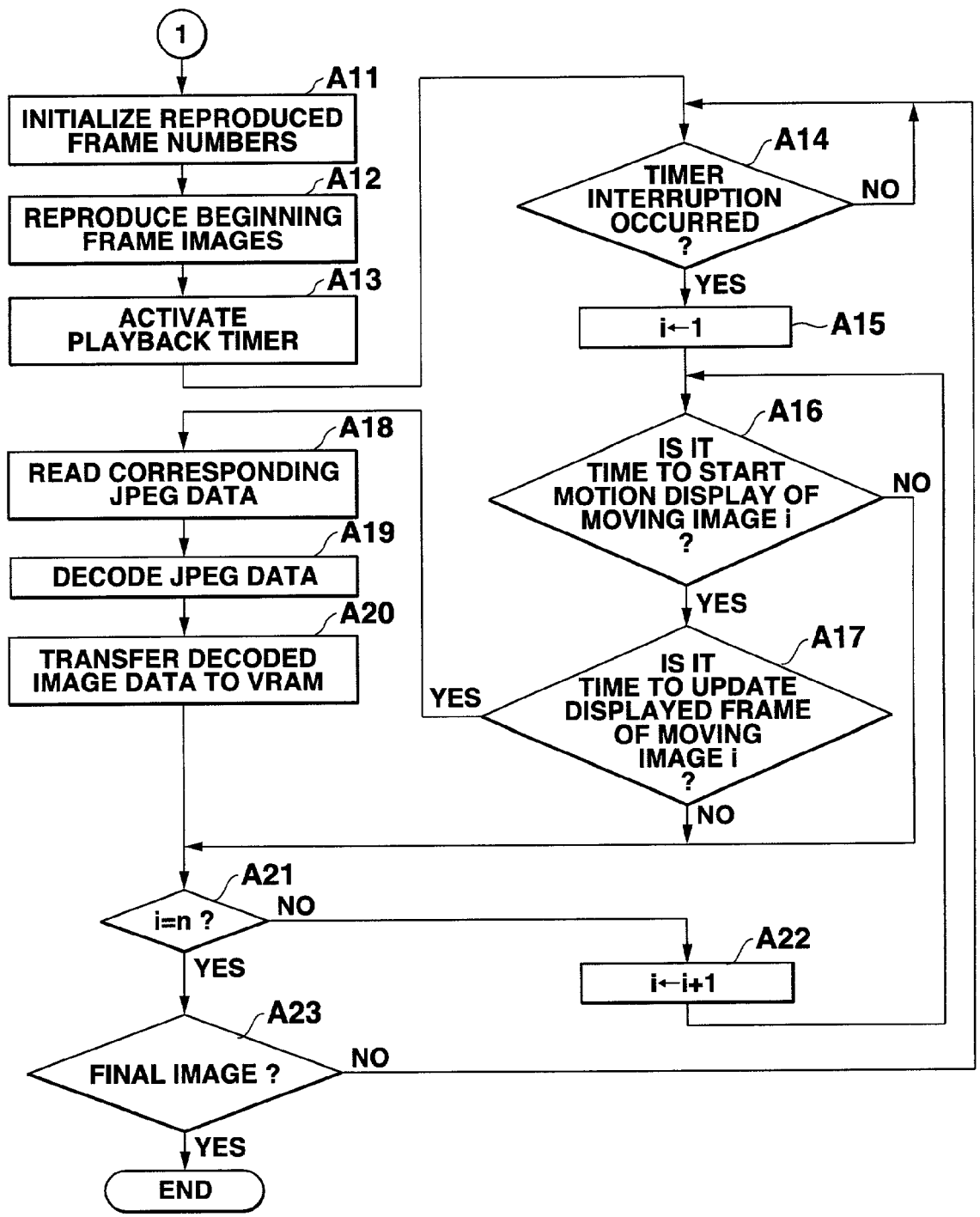

FIGS. 2 and 3 show the processing in the reproduce mode mainly performed by the CPU 21 in reading a plurality of items of moving image data (moving image files) from the flash memory 28 and reproducing them simultaneously in a multi-image display format.

First, an arbitrary number of items of moving image data is selected from moving image data recorded in the flash memory 28 (step A01) and then the number, n, of the selected items of moving image data is set.

The CPU 21 then sets the pointer i to moving image data to the initial value "1" (step A02) and reads parameter values associated with the moving image data first selected according to pointer value i=1 (step A03). Specifically, the parameter values are the overall playback time and the frame rate.

Next, to set a frame range over which each moving image data is to be reproduced, the beginning frame number and the ending frame number are specified (step A04). This is done by first displaying a plurality of contiguous frames of still image data constituting a moving image data file at the same time (i.e., in a multi-image display form) on the display unit 25, then operating the cursor key to move the cursor to a desired still image and operating the Enter key to determine the beginning or ending frame.

After the frame range has been set in that manner, the playback time is calculated, in step A05, in accordance with playback time=(ending frame number−beginning frame number+1)×frame rate A decision is next made as to whether or not the pointer value, i, equals the number, n, of the selected items of moving image data (step A06). If it does not, then the procedure goes to step A07 where the pointer value i is incremented by one. After that, the process is repeated beginning with step A03.

By carrying out steps A03 through A07 repeatedly, the same processing is performed on each of the selected items of moving image data.

FIGS. 4A, 4B and 4C show exemplary frame range settings for three items of moving image data 1, 2 and 3 recorded on the flash memory 28. Assuming here that each moving image data has the same frame rate for the purpose of simplifying explanation, the playback time is shown to increase in the order of moving image 2, moving image 3, and moving image 1.

On termination of the processing on all the selected moving image data, the pointer value i will be determined in step A06 to be equal to n, the number of the selected items of moving image data. After that, the moving image data that is the longest in playback time is selected (step A08). Concerning the other moving images, the timing of starting of playback of each moving image is calculated based on its playback time, number of frames and frame rate so that it is timed to end at the same time the longest moving image ends. The resulting starting time is set (step A09).

In this manner, the processing as preparation for playback terminates. The CPU waits for an operation of the shutter key in order to start playback (step A10).

If the decision in step A10 is that the shutter key has been operated to start playback, the CPU sets the frame numbers specified as the beginning frames of the respective moving images as initial values of reproduced frames (step A11). After that, still image data corresponding to the frame number is read from the flash memory 28 into the JPEG circuit 27 where it is decoded by decompression which is the reverse of compression at record time and reduced in size for multi-image display. The resulting still image data is sent via the VRAM controller 22 to the VRAM 23 where it is expanded and stored. The video encoder 24 produces a corresponding video signal for multi-image display, which is in turn reproduced the display unit 25. This sequence of processes is repeated for each moving image data (step A12).

In this example, since the number of the selected moving images is three (n=3), the screen of the display unit 25 is divided into four (=2×2) areas three of which are used for multi-image display.

When the multi-image display is started, the CPU 21 activates its master timer as playback timer so that interrupt signals are obtained at time intervals separated by a display time for one frame (frame rate) (step A13). The CPU then waits for an interrupt signal (step A14).

If the decision in step A14 is that an interruption has occurred from the playback timer, then the pointer value i for moving image data is set to the initial value, or one (step A15). A decision is then made as to whether or not it is time to start the motion display (movie playback) of the first selected moving image or the start time was past (step A16).

The moving image 1 is the longest in playback time as described previously and is therefore to be reproduced from the beginning with its displayed frames updated in sequence by interruptions caused by the playback timer. Thus, it is decided here that it is time to start the motion display. To cope with a situation where each moving image data has a different frame rate, a decision is made as to whether it is time to update the displayed frame of the moving image 1 (step A17).

To display two or more items of moving image data each having a different frame rate in multi-image display form, a time corresponding to the greatest common divisor of one-frame display times of the respective items of moving image data is set in the playback timer. Step A17 is for deciding, with each interruption from the timer, whether or not it is time to update the displayed frame of each moving image data.

When the decision is that it is time to update the displayed frame of the moving image 1, still image data for the corresponding frame, frame 2 in this example, is read from the flash memory 28 (step A18) and then decompressed in the JPEG circuit 27 (step A19). Further, the image data is reduced in size for multi-image display and then expanded and stored in the corresponding display area to the moving image 1 in the VRAM 23 (step A20). The displayed frame of the moving image 1 on the multi-image display screen is then updated.

Next, a decision is made as to whether or not the pointer value i is equal to the number n of the selected moving images (step S21). If it is not, then the procedure goes to step A22 where the pointer value i is incremented by one to two. Then, the processing beginning with step A16 is performed on the moving image 2.

In this example, the moving image 2 is set to be the shortest in playback time. In step A16, it is therefore decided that the moving image playback start time is not yet reached. Thus, the procedure goes through step A21 to step A22 where the pointer value i is incremented by one to three.

Thus, the processing proceeds to the moving image 3. In the case of the moving image 3 as well, it is here decided that the playback start time is not yet reached and hence the processing in steps A17 to A20 is not carried out. If i=n in step A21, then a decision is made as to whether or not those frames of the respective moving images which are displayed at that time are their ending frames (step A23). If they are not, then the procedure returns again to step A14 to wait for the next interrupt signal from the playback timer.

By performing the processing beginning with step A15 repeatedly each time an interruption is caused by the playback timer, moving image data displayed on the multi-image screen for which motion display has already been started has its displayed frame updated so that displayed contents are rewritten. For moving image data whose motion display start time has been reached, the displayed frame is updated from the beginning frame to the next frame, so that the displayed contents are rewritten.

FIG. 4D shows the timing by which the three moving images 1, 2 and 3 are displayed frame by frame in a multi-image display format on the display unit 25. From FIG. 4D, it is seen that, to make the moving images 2 and 3 coincident in display time with the moving image 1 longest in playback time, the beginning frames of the moving images 2 and 3 are displayed repeatedly until their motion display is started and the motion display of each of the moving images 1, 2 and 3 is terminated simultaneously at their respective ending frames.

The processing shown in FIGS. 2 and 3 is complete when, after it has been decided in step A21 that i=n, it is decided in step A23 that the ending frames of the respective moving images are being displayed.

Instead of keeping the ending of motion display of each moving image in time coincidence as described above, it is also possible to designate an arbitrary frame position in all moving images, extract a first moving image which has the longest playback time in the portion before the designated frame and a second moving image which has the longest playback time in the portion after the designated frame, and repeatedly display the beginning frames of moving images other than the first moving image and the ending frames of moving images other than the second moving image.

In the first embodiment, although the beginning frame of a moving image is displayed in still form until motion display is started, it has not to be displayed.

SECOND EMBODIMENT

A second embodiment of the present invention will be described in terms of a digital camera.

The circuit configuration of the second embodiment remains basically unchanged from that shown in FIG. 1. In the second embodiment, therefore, components corresponding to those in FIG. 1 are denoted by like reference numerals and their illustration and description are omitted.

Figure 5:
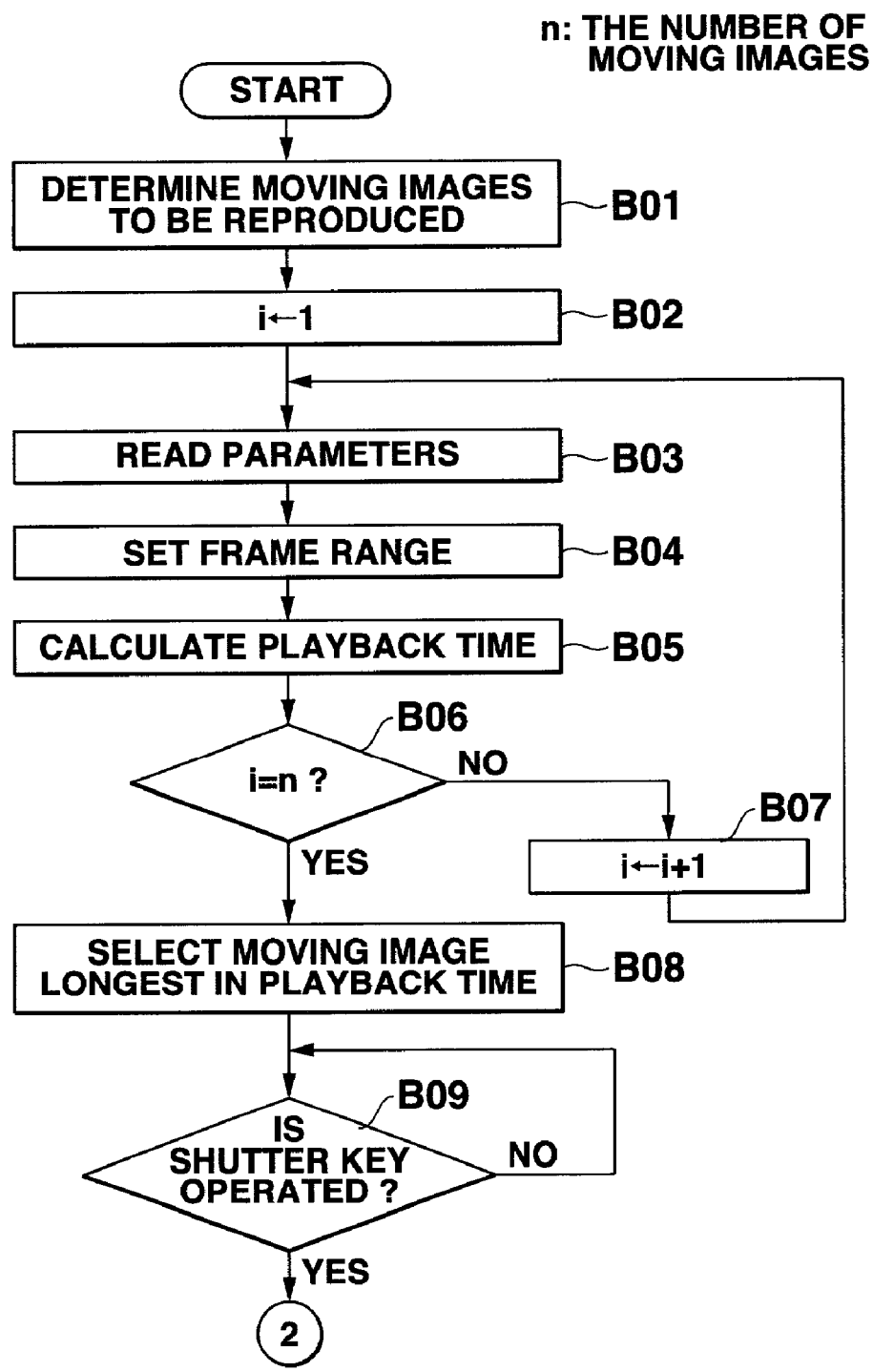
FIGS. 5 and 6 form a flowchart for the processing of reproducing two or more moving images simultaneously in accordance with a second embodiment of the present invention.
Figure 6:
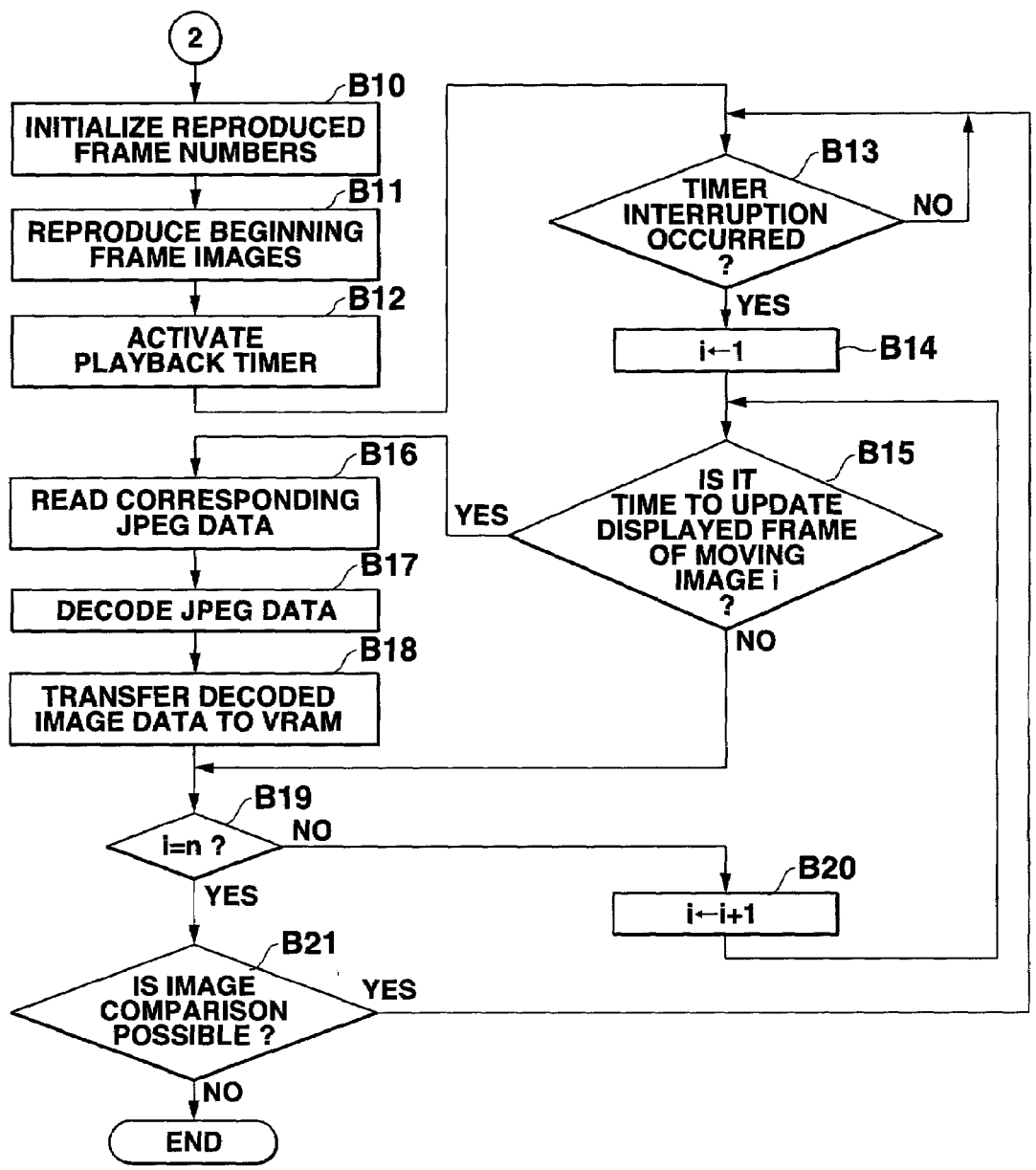

FIGS. 5 and 6 show the processing in the reproduce mode mainly performed by the CPU 21 in reading a plurality of items of moving image data from the flash memory 28 and reproducing them simultaneously in a multi-image display format.

First, an arbitrary number of items of moving image data is selected from moving image data recorded in the flash memory 28 (step B01) and then the number, n, of the selected items of moving image data is set.

The CPU 21 then sets the pointer i to moving image data to the initial value "1" (step B02) and reads parameter values associated with the moving image data first selected according to pointer value i=1 (step B03). Specifically, the parameter values are the overall playback time and the frame rate.

Next, to set a frame range over which each moving image data is to be reproduced, the beginning frame number and the ending frame number are specified (step B04). This is done by first displaying a plurality of contiguous frames of still image data constituting an item of moving image data in a multi-image display form on the display unit 25 and then accepting operations of the cursor key and the Enter key in the key entry unit 26 to determine the beginning and ending frames.

After the frame range for moving image playback has been set in that manner, the playback time is calculated, in step B05, by playback time=(ending frame number−beginning frame number+1)×frame rate A decision is next made as to whether or not the pointer value i equals the number n of the selected items of moving image data (step B06). If it does not, then the procedure goes to step B07 where the pointer value i is incremented by one. After that, the process is repeated again beginning with step B03.

By carrying out steps B03 through B07 repeatedly, the same processing is performed on each of the selected items of moving image data.

FIGS. 7A, 7B and 7C show exemplary frame range settings for three items of moving image data 1, 2 and 3 recorded on the flash memory 28. Assuming here that each moving image data has the same frame rate for the purpose of simplifying explanation, the playback time is shown to increase in the order of moving image 2, moving image 3, and moving image 1.

On termination of the processing on all the selected moving image data, the pointer value i is determined in step B06 to be equal to n, the number of the selected items of moving image data. After that, the moving image data that is the longest in playback time, i.e., the largest in the number of frames, is selected (step B08).

In this manner, the processing as preparation for playback terminates. The CPU waits for an operation of the shutter key in order to start playback (step B09).

If the decision in step B09 is that the shutter key has been operated to start playback, then the CPU sets the frame numbers specified as the beginning frames of the respective moving images as initial values of reproduced frames (step B10). After that, still image data corresponding to the frame numbers is read from the flash memory 28 into the JPEG circuit 27 where it is decoded by decompression which is the reverse of compression at record time and reduced in size for multi-image display. The resulting still image data is sent via the VRAM controller 22 to the VRAM 23 where it is expanded and stored. The video encoder 24 produces a corresponding video signal for multi-image display, which is in turn displayed on the display unit 25. This sequence of processes is repeated for each selected moving image data (step B11).

In this example, since the number of the selected moving images is three (n=3), the screen of the display unit 25 is divided into four (2×2) areas, three of which are used for multi-image display.

When the multi-image display is started, the CPU 21 activates its master timer as playback timer so that interrupt signals are obtained at time intervals separated by a constant display time from the timer (step B12). The CPU then waits for an interrupt signal (step B13).

If the decision in step B13 is that an interruption has occurred from the playback timer, then the pointer value i for moving image data is set to the initial value, or one (step B14). A decision is then made as to whether or not it is time to update the displayed frame of the first selected moving image (step B15).

To display two or more items of moving image data each having a different frame rate in multi-image display form, a time corresponding to the greatest common divisor of one-frame display times of the respective items of moving image data is set in the playback timer. Step B15 is for deciding, with each interruption from the timer, whether or not it is time to update the displayed frame of each moving image data.

When the decision is that it is time to update the displayed frame of the moving image 1, still image data for the corresponding frame, frame 2 in this example, is read from the flash memory 28 (step B16) and then decompressed in the JPEG circuit 27 (step B17). Further, the image data is reduced in size for multi-image display and then expanded and stored in the display area corresponding to the moving image 1 in the VRAM 23 (step B18). The displayed frame of the moving image 1 on the multi-image display screen is updated.

Next, a decision is made as to whether or not the pointer value i is equal to the number n of selected moving images (step B19). If it is not, then the procedure goes to step B20 where the pointer value i is incremented by one to two. Then, the processing beginning with step B15 is performed on the moving image 2.

In this case, for moving image 2 as well, it is decided in step B15 that its displayed frame needs to be updated. A new frame is then read and displayed through steps B16 to B18. The procedure then goes through step B19 to step B20 where the pointer value i is incremented by one to three.

For moving image 3 as well, it is decided in step B15 that its displayed frame needs to be updated. A new frame of image data is then read and displayed through steps B16 to B18. If the decision in step B19 is that i=n, then a decision is next made in step B21 as to whether or not the number of new frames of still image data to be read at the next update time is more than one. If it is, then the procedure returns to step B13 to wait for the next interrupt signal from the playback timer.

Thus, by repeating the processing beginning with step B14 with each interruption from the timer, each moving image on the multi-image screen has its displayed frame updated and its displayed contents changed.

After the ending frame #7 of moving image 2 shortest in playback time has been displayed, the motion display of that moving image over the designated frame range has already been terminated at the next update time. Because of the absence of a new frame of still image data to be read, the ending frame of the moving image 2 continues to be displayed as it is. Of course, the display of the ending frame does not necessarily have to be continued.

The display of the frame #10 of the moving image 3 leads to the decision in step B19 that i=n. In subsequent step B21 it is decided that, because the motion display of the moving images 1 and 3 is not yet complete, there is more than one moving image whose motion display is not terminated. That is, the moving image 1 has a new frame #7 and the moving image 3 has a new frame #11. Therefore, the motion display is continued.

When the ending frame 12 of the moving image 3, which is the next shortest in the playback time, is displayed at a later time, the procedure goes through step B19 to step B21. In this case, although the moving image 1 has a frame to be read next, i.e., the frame #9, the moving images 2 and 3 have no frame to be read next. Therefore, the decision in step B21 is that no image comparison can be made and consequently the procedure shown in FIGS. 5 and 6 is complete.

FIG. 7D shows the timing by which the moving images 1, 2 and 3 are displayed on a frame-by-frame basis in a multi-image display format on the display unit 25. As described above, even after the termination of the motion display of the moving image 2 the shortest in playback time, the motion display of the moving images 1 and 3 is not terminated. Thus, the ending frame #7 of the moving image 2 continues to be displayed as a still image. When the display of the ending frame #12 of the moving image 3 next shortest in playback time terminates, there no longer exist two or more moving images to be displayed in a multi-image format for comparison. After the termination of display of the frame #8 of the moving image 1, the ending frame #7 of the moving image 2 and the ending frame #12 of the moving image 3, the multi-image display is complete without performing any further processing.

Therefore, the frames #9 and #10 of the moving image 1 are not displayed.

Although, in the second embodiment, the display is stopped at the time when comparison between the displayed contents of moving images becomes disabled, the frames of moving images at that time (i.e., the frame #8 of the moving image 1, the frame #7 of the moving image 2 and the frame #12 of the moving image 3) may be displayed as still images.

THIRD EMBODIMENT

A third embodiment of the present invention will be described hereinafter in terms of a digital camera.

The circuit configuration of the third embodiment remains basically unchanged from that shown in FIG. 1. In the third embodiment as well, therefore, components corresponding to those in FIG. 1 are denoted by like reference numerals and their illustration and description are omitted.

Figure 8:
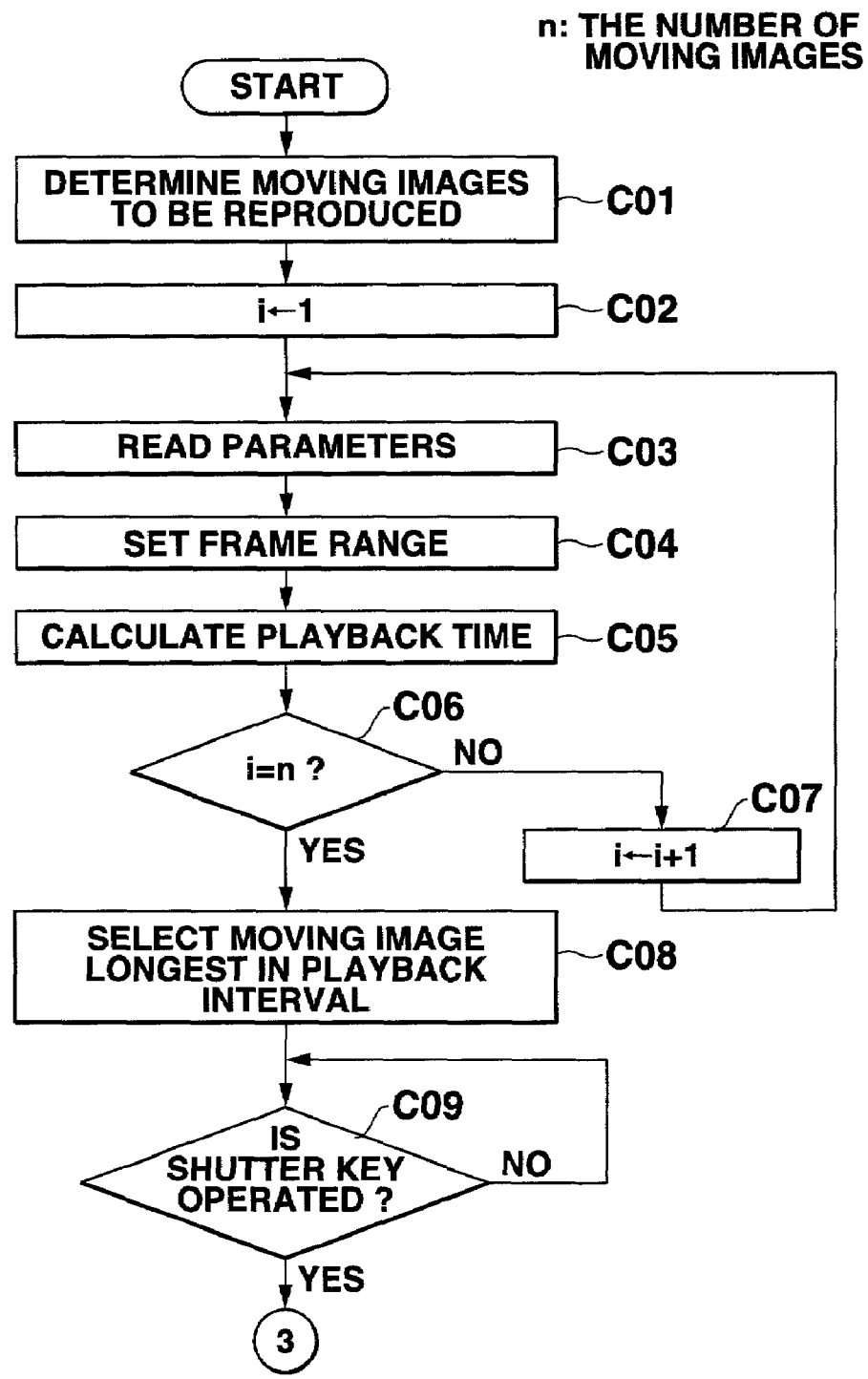
FIGS. 8 and 9 form a flowchart for the processing of reproducing two or more moving images simultaneously in accordance with a third embodiment of the present invention.
Figure 9:
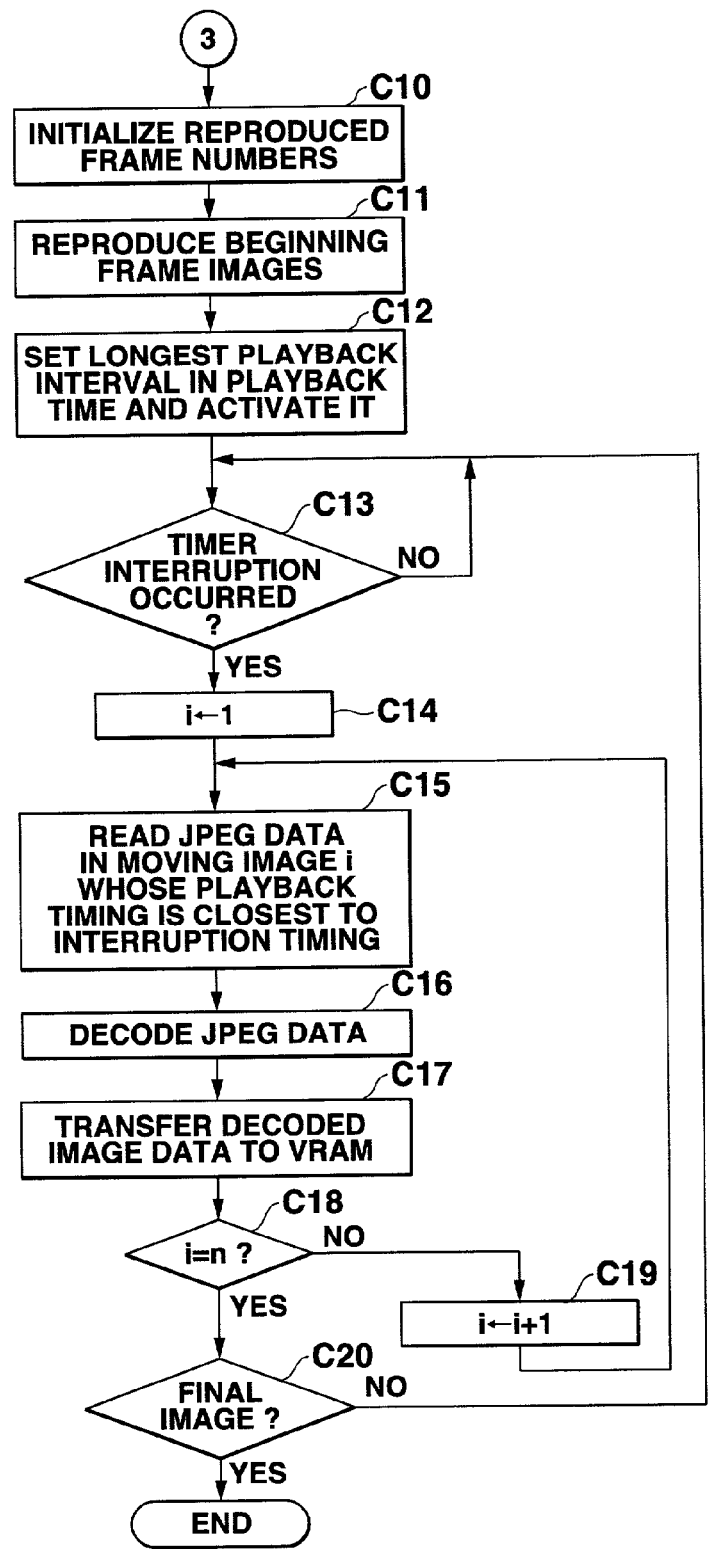

FIGS. 8 and 9 show the processing in the reproduce mode mainly performed by the CPU 21 in reading a plurality of items of moving image data from the flash memory 28 and reproducing them simultaneously in a multi-image display format.

First, an arbitrary number of items of moving image data is selected from moving image data recorded on the flash memory 28 (step C01) and then the number, n, of the selected items of moving image data is set.

The CPU 21 then sets the pointer i to moving image data to the initial value "1" (step C02) and reads parameter values associated with the moving image data first selected according to pointer value i=1 (step C03). Specifically, the parameter values are the overall playback time and the frame rate.

Next, to set a frame range over which each moving image data is to be reproduced, the beginning frame number and the ending frame number are specified (step C04). This is done by first displaying a plurality of contiguous frames of still image data constituting an item of moving image data in a multi-image display form on the display unit 25 and then accepting operations of the cursor key and the Enter key in the key entry unit 26 to determine the beginning and ending frames on the display screen.

After the frame range has been set in that manner, the playback time is calculated, in step C05, by playback time=(ending frame number−beginning frame number+1)×frame rate A decision is next made as to whether or not the pointer value i equals the number n of selected items of moving image data (step C06). If it does not, then the procedure goes to step C07 where the pointer value i is incremented by one. After that, the process is repeated again beginning with step C03.

By carrying out steps C03 through C07 repeatedly, the same processing is performed on each of the selected items of moving image data.

On termination of the processing on all the selected moving image data, the pointer value i is determined in step C06 to be equal to n, the number of the selected items of moving image data. After that, the item of moving image data that is the longest in playback interval, i.e., the lowest in frame rate, is selected (step C08).

In this manner, the processing as preparation for playback terminates. The CPU waits for the shutter key to be operated in order to start playback (step C09).

If the decision in step C09 is that the shutter key has been operated, then the CPU sets the frame numbers specified as the beginning frames of the respective moving images as initial values of the numbers of reproduced frames (step C10). After that, still image data corresponding to the beginning frame number is read from the flash memory 28 into the JPEG circuit 27 where it is decoded by decompression which is the reverse of compression at record time and reduced in size for multi-image display. The resulting still image data is sent via the VRAM controller 22 to the VRAM 23 where it is expanded and stored. The video encoder 24 produces a corresponding video signal for multi-image display, which is in turn reproduced on the display unit 25. This sequence of processes is repeated for each moving image data (step C11).

In this example, since three moving images are selected (n=3), the screen of the display unit 25 is divided into four (2×2) areas, three of which are used for multi-image display.

When the multi-image display is started, the CPU 21 sets the longest playback interval selected in step C08 in the playback timer and then activates the timer so that interrupt signals are obtained at time intervals separated by a constant display time from the timer (step C12). The CPU then waits for an interrupt signal (step C13).

If the decision in step C13 is that an interruption has occurred from the playback timer, then the pointer value i for moving image data is set to the initial value, or one (step C14). The frame number of the first selected moving image 1 is then updated according to i=1 to read corresponding new still image data from the flash memory 28 (step C15).

In this case, the new frame number of still image data to be read is the one that is the closest to the result of the arithmetic operation:

count value in playback timer (playback time up to the present time)/frame rate of moving image i(playback time interval)

That is, the frame of new still image data to be read is the one whose playback timing is the closest to the timing of playback of the next frame of the moving image which is the longest in playback interval.

The still image data thus read is decompressed in the JPEG circuit 27 (step C16). Further, the image data is reduced in size for multi-image display and then expanded and stored in the corresponding display area to the moving image 1 in the VRAM 23 (step C17). The displayed frame of the moving image 1 on the multi-image display screen is updated.

Next, upon determining that the pointer value i is not equal to the number n of selected moving images (step C18), the pointer value i is incremented by one to two (step C19). The procedure then returns to step C15, whereby the displayed frame of the moving image 2 is updated through steps C15 to C17.

By performing steps C15 to C19 repeatedly, each moving image data has its displayed frame updated to a frame which is the closest in playback timing to the next frame of the moving image data which is the longest in playback interval.

On determining that i=n in step C18 after the displayed frame of the moving image 3 has been updated, a decision is made as to whether or not that frame of the moving image 3 longest in playback interval which is being displayed at that time is the final frame within the previously set frame range (step C20). If it is not, that is, if further frame updating is possible, then the procedure returns again to step C13 to wait for the next interrupt signal from the playback timer.

With each interruption from the playback timer, the processing is repeated beginning with step C14. Thereby, the displayed frame of each moving image data on the multi-image screen is updated.

When, in step C20, the image being displayed is determined to be the final image within the previously set frame range, that is, there is no more frame to be displayed, the processing of FIGS. 8 and 9 is complete.

Figure 10:
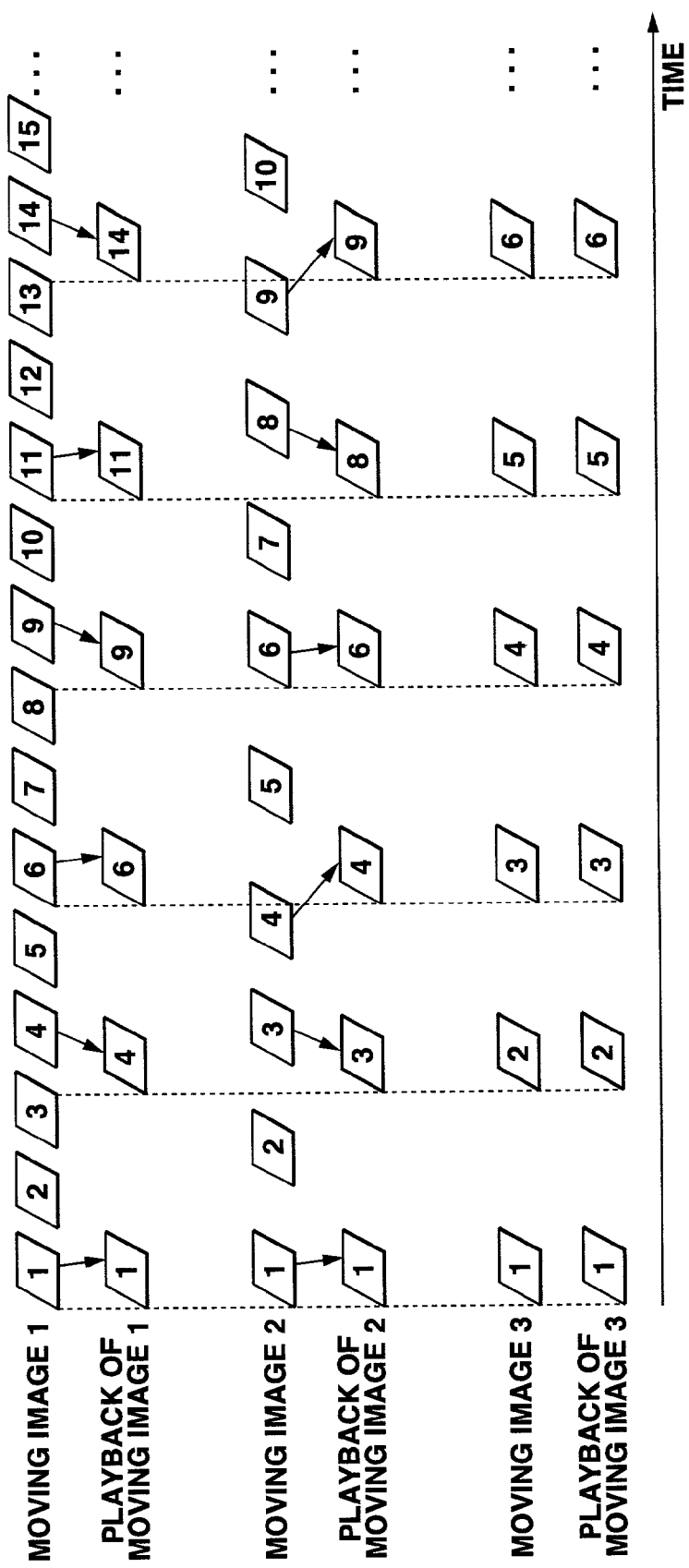
FIG. 10 is a diagram for use in explanation of the way in which three moving images are reproduced simultaneously in accordance with the third embodiment of the present invention.

FIG. 10 shows the timing by which the moving images 1, 2 and 3 recorded in the flash memory 28 are reproduced with their first frames as the beginning frames.

In this example, it is assumed that each of the moving images 1, 2 and 3 has a different frame rate and the moving image 3 is the lowest in frame rate, i.e., the longest in the interval at which frames are reproduced. The frame updating of the moving images 1 and 2 is timed to the frame updating of the moving image 3.

In FIG. 10, the numbers of frames to be reproduced actually in each moving image are shown below the frame sequence in the corresponding moving image data. In this example, since the moving image 3 is the lowest in frame rate, its frames are all updated and reproduced.

On the other hand, in each of the moving images 1 and 2, a frame whose playback timing is the closest to that of each frame of the moving image 3 is selected and reproduced.

FOURTH EMBODIMENT

A fourth embodiment of the present invention will be described hereinafter in terms of a digital camera.

The circuit configuration of the fourth embodiment remains basically unchanged from that shown in FIG. 1. In the fourth embodiment as well, therefore, components corresponding to those in FIG. 1 are denoted by like reference numerals and their illustration and description are omitted.

Figure 11:
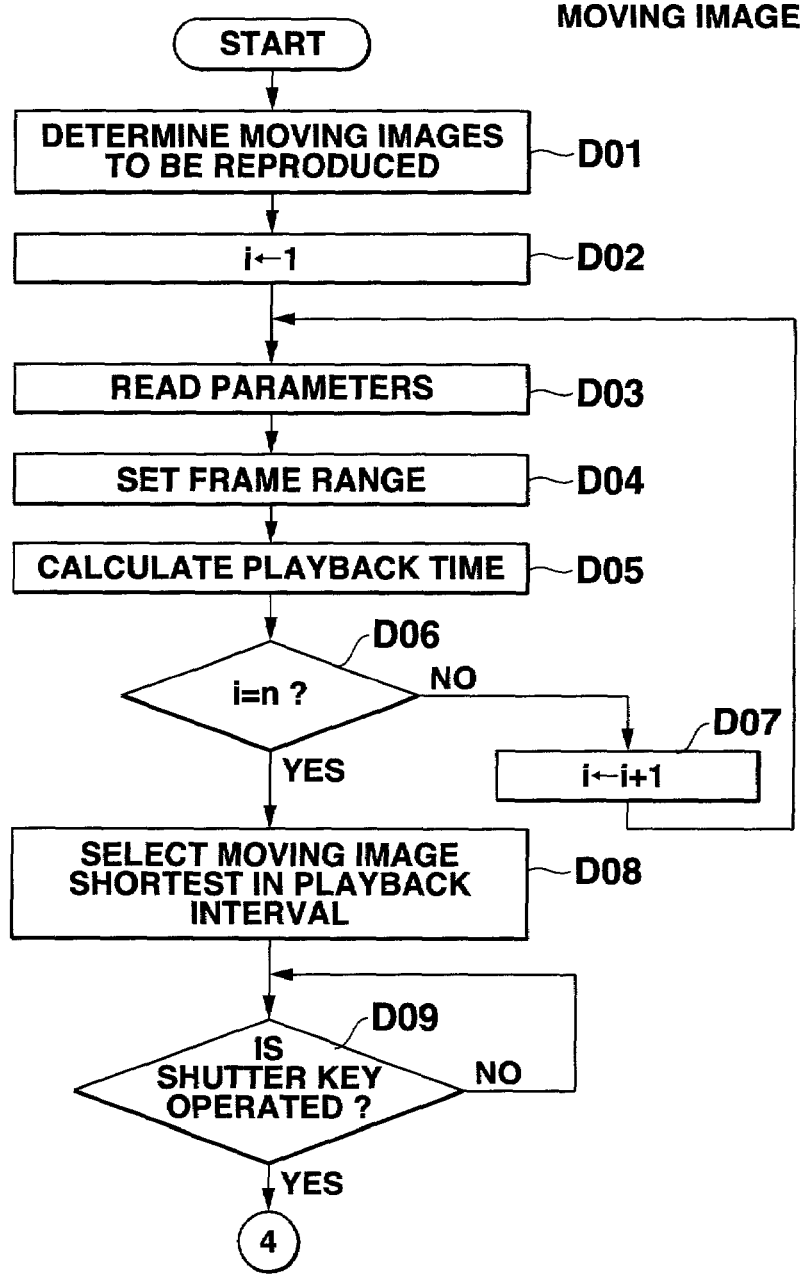
FIGS. 11 and 12 form a flowchart for the processing of reproducing two or more moving images simultaneously in accordance with a fourth embodiment of the present invention.
Figure 12:
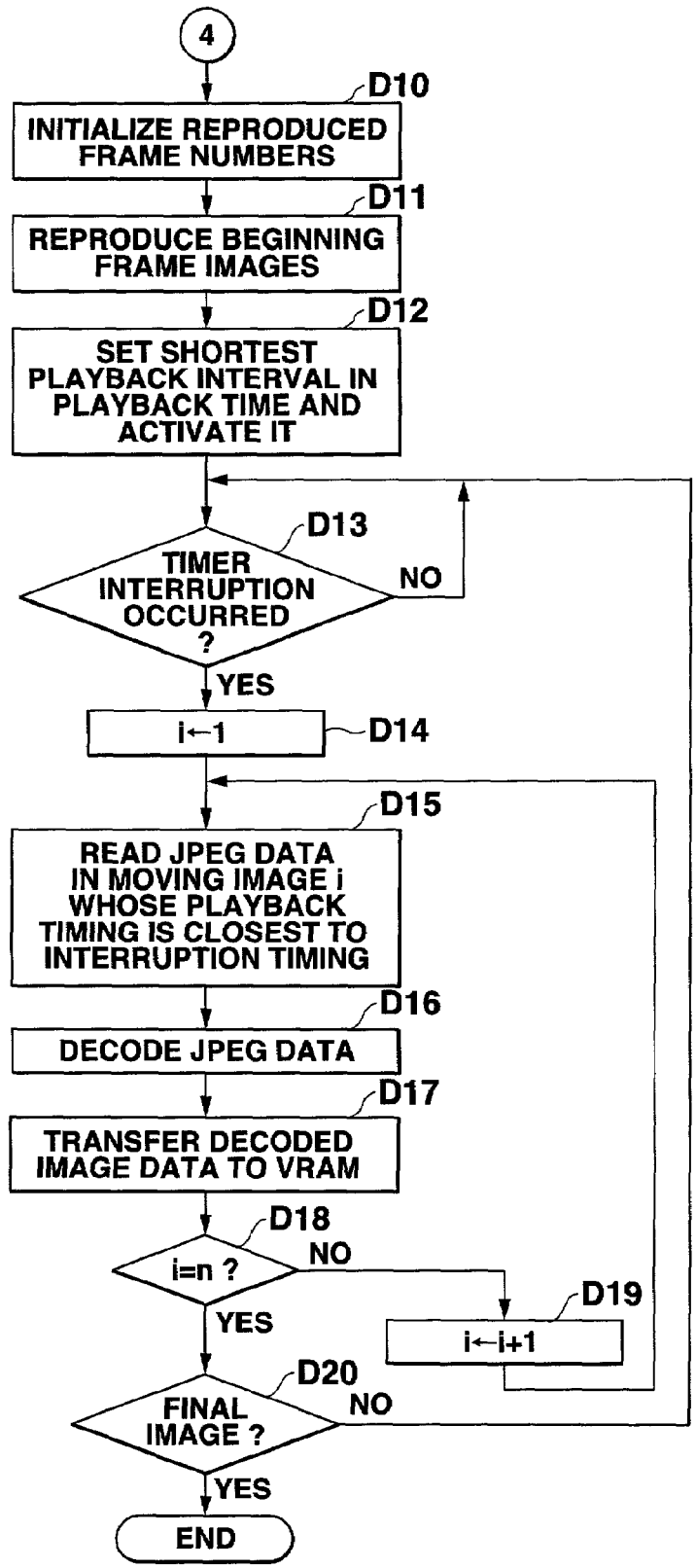

FIGS. 11 and 12 show the processing in the reproduce mode mainly performed by the CPU 21 in reading a plurality of items of moving image data from the flash memory 28 and reproducing them simultaneously in a multi-image display format.

First, an arbitrary number of items of moving image data is selected from moving image data recorded in the flash memory 28 (step D01) and then the number, n, of selected items of moving image data is set.

The CPU 21 then sets the pointer i to moving image data to the initial value "1" (step D02) and reads parameter values associated with the moving image data first selected according to pointer value i=1 (step D03). Specifically, the parameter values are the overall playback time and the frame rate.

Next, to set a frame range over which each moving image data is to be reproduced, the beginning frame number and the ending frame number are specified (step D04). This is done by first displaying a plurality of contiguous frames of still image data constituting an item of moving image data in a multi-image display form on the display unit 25 and then accepting operations of the cursor key and the Enter key in the key entry unit 26 to determine the beginning and ending frames on the display screen.

After the frame range has been set in that manner, the playback time is calculated, in step D05, by playback time=(ending frame number−beginning frame number+1)×frame rate A decision is next made as to whether or not the pointer value i equals the number n of selected items of moving image data (step D06). If it does not, then the procedure goes to step D07 where the pointer value i is incremented by one. After that, the process is repeated again beginning with step D03.

By carrying out steps D03 through D07 repeatedly, the same processing is performed on each of the selected items of moving image data.

On termination of the processing on all the selected moving image data, the pointer value i is determined in step D06 to be equal to n, the number of selected items of moving image data. After that, the item of moving image data that is the shortest in playback interval, i.e., the highest in frame rate, is selected (step D08).

In this manner, the processing as preparation for playback terminates. The CPU waits for operation of the shutter key in order to start playback (step D09).

When the shutter key is operated (YES in step D09), the CPU sets the frame numbers specified as the beginning frames of the respective moving images as initial values of the numbers of reproduced frames (step D10). After that, still image data corresponding to the frame number is read from the flash memory 28 into the JPEG circuit 27 where it is decoded by decompression which is the reverse of compression at record time and reduced in size for multi-image display. The resulting still image data is sent via the VRAM controller 22 to the VRAM 23 where it is expanded and stored. The video encoder 24 produces a corresponding video signal for multi-image display, which is in turn reproduced on the display unit 25. This sequence of processes is repeated for each moving image data (step D11).

In this example, since three moving images are selected (n=3), the screen of the display unit 25 is divided into four (2×2) areas, three of which are used for multi-image display.

Upon start of motion display, the CPU 21 sets the shortest playback interval selected in step D08 in the playback timer and then activates the timer so that interrupt signals are obtained at time intervals separated by a constant display time from the timer (step D12). The CPU then waits for an interrupt signal (step D13).

If the decision in step D13 is that an interruption has occurred from the playback timer, then the pointer value i for moving image data is set to the initial value, or one (step D14). The frame number of the moving image 1 first selected according to i=1 is then updated to read corresponding new still image data from the flash memory 28 (step D15).

In this case, the new frame number of still image data to be read is one that is the closest to the result of the arithmetic operation:

count value in playback timer/frame rate of moving image $i$

That is, the frame of new still image data to be read is one whose playback timing is the closest to the timing of playback of the next frame of the moving image which is the shortest in playback interval.

The still image data thus read is decompressed in the JPEG circuit 27 (step D16). Further, the image data is reduced in size for multi-image display and then expanded and stored in the display area corresponding to the moving image 1 in the VRAM 23 (step D17). The displayed frame of the moving image 1 on the multi-image display screen is then updated.

Next, upon determining that the pointer value i is not equal to the number n of the selected moving images (step D18), the pointer value i is incremented by one to two (step D19). The procedure then returns to step D15, whereby the displayed frame of the moving image 2 is updated through steps D15 to D17.

By performing steps D15 to D19 repeatedly, each moving image data has its displayed frame updated to the frame which is the closest in playback timing to the next frame of the moving image data which is the shortest in playback interval.

On determining that i=n in step D18 after the displayed frame of the moving image 3 has been updated, a decision is made as to whether or not that frame of the moving image 1 shortest in playback interval which is being displayed at that time is the final frame within the previously set frame range (step D20). If it is not, that is, if further frame updating is possible, then the procedure returns again to step D13 to wait for the next interrupt signal from the playback timer.

With each interruption from the playback timer, the processing is repeated beginning with step D14. Thereby, the displayed frame of each moving image data on the multi-image screen is updated.

When, in step D20, the image being displayed is determined to be the final image within the previously set frame range, that is, there are no more frames to be displayed, the processing of FIGS. 11 and 12 is complete.

Figure 13:
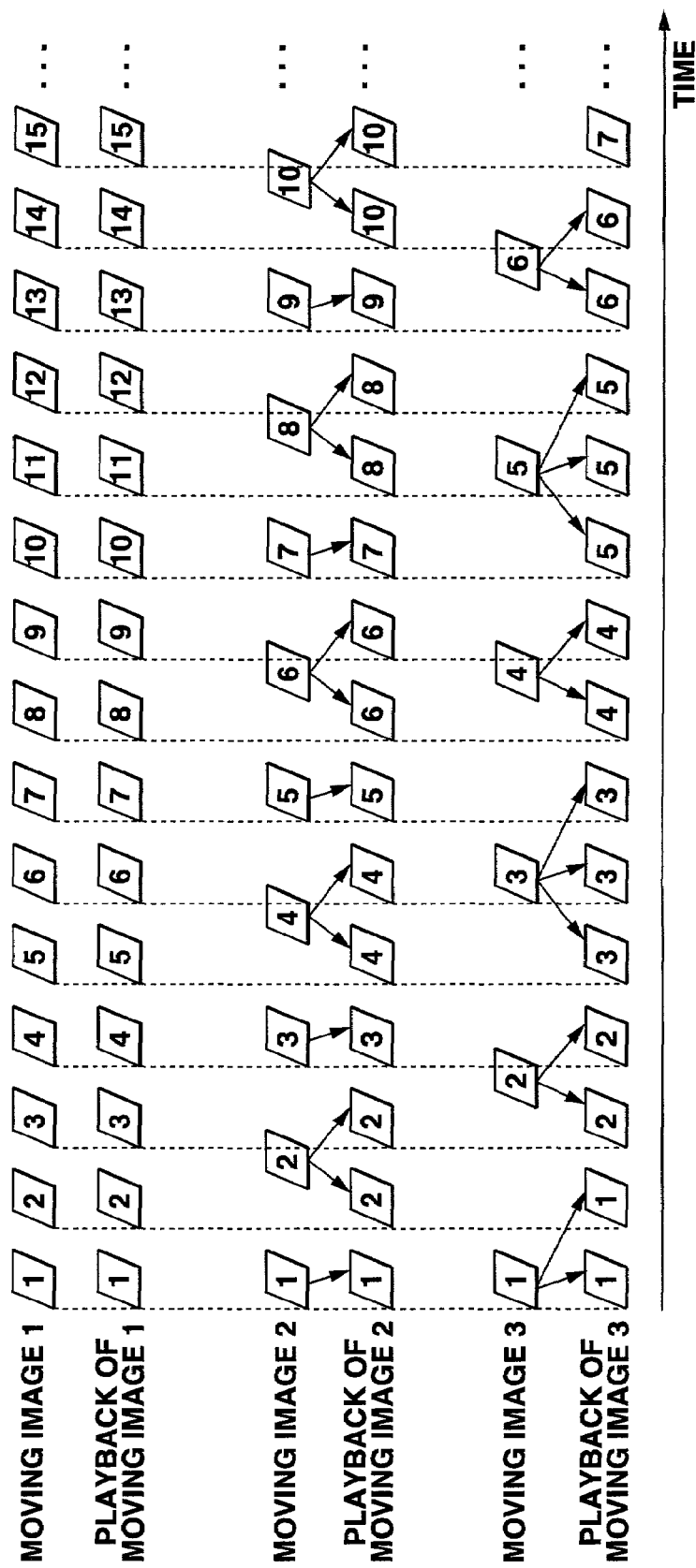
FIG. 13 is a diagram for use in explanation of the way in which three moving images are reproduced simultaneously in accordance with the fourth embodiment of the present invention.

FIG. 13 shows the timing by which the moving images 1, 2 and 3 recorded in the flash memory 28 are reproduced with their first frames as the beginning frames.

In this example, it is assumed that each of the moving images 1, 2 and 3 has a different frame rate and the moving image 1 is the highest in frame rate, i.e., the shortest in the interval at which frames are reproduced. The frame updating of the moving images 1 and 2 is timed to the frame updating of the moving image 1.

In FIG. 13, the numbers of frames to be reproduced actually in each moving image are shown below the frame sequence in the corresponding moving image data. In this example, since the moving image 1 is the highest in frame rate, its frames are all updated and reproduced according to its frame rate.

On the other hand, in the moving images 2 and 3, their frames whose playback time is the closest to the time a displayed frame of the moving image 1 is updated are reproduced once or in succession.

The third embodiment is configured to reproduce the moving images 1 and 2 to the playback interval of the moving image 3 lowest in frame rate, whereas the fourth embodiment is configured to reproduce the moving images 2 and 3 to the playback interval of the moving image 1 highest in frame rate. As an alternative, the moving images 1 and 3 may be reproduced to the playback interval of the moving image 2 which is lower and higher in frame rate than the moving images 1 and 2, respectively. In this case, the moving image 2 has all its frames reproduced in sequence, the moving image 1 has its frames skip reproduced as in the third embodiment, and the moving image 3 has its frames reproduced repeatedly as in the fourth embodiment.

Further, it is also possible to calculate the optimum frame rate different from the frame rates of the respective moving images 1, 2 and 3 based on them and cause each of the moving images to be skip or repeat reproduced according to the calculated frame rate.

In the third embodiment, even when a frame is reproduced repeatedly, a sequence of processes (steps D15 to D17) is performed each time the frame is reproduced. When the frame number of still image data to be read coincides with the frame number of still image data which has already been expanded and stored in the VPAM 23, the processes in steps D15 to D17 may be omitted (skipped).

FIFTH EMBODIMENT

A fifth embodiment of the present invention will be described hereinafter in terms of a digital camera.

The circuit configuration of the fifth embodiment remains basically unchanged from that shown in FIG. 1. In the fifth embodiment as well, therefore, components corresponding to those in FIG. 1 are denoted by like reference numerals and their illustration and description are omitted.

Figure 14:
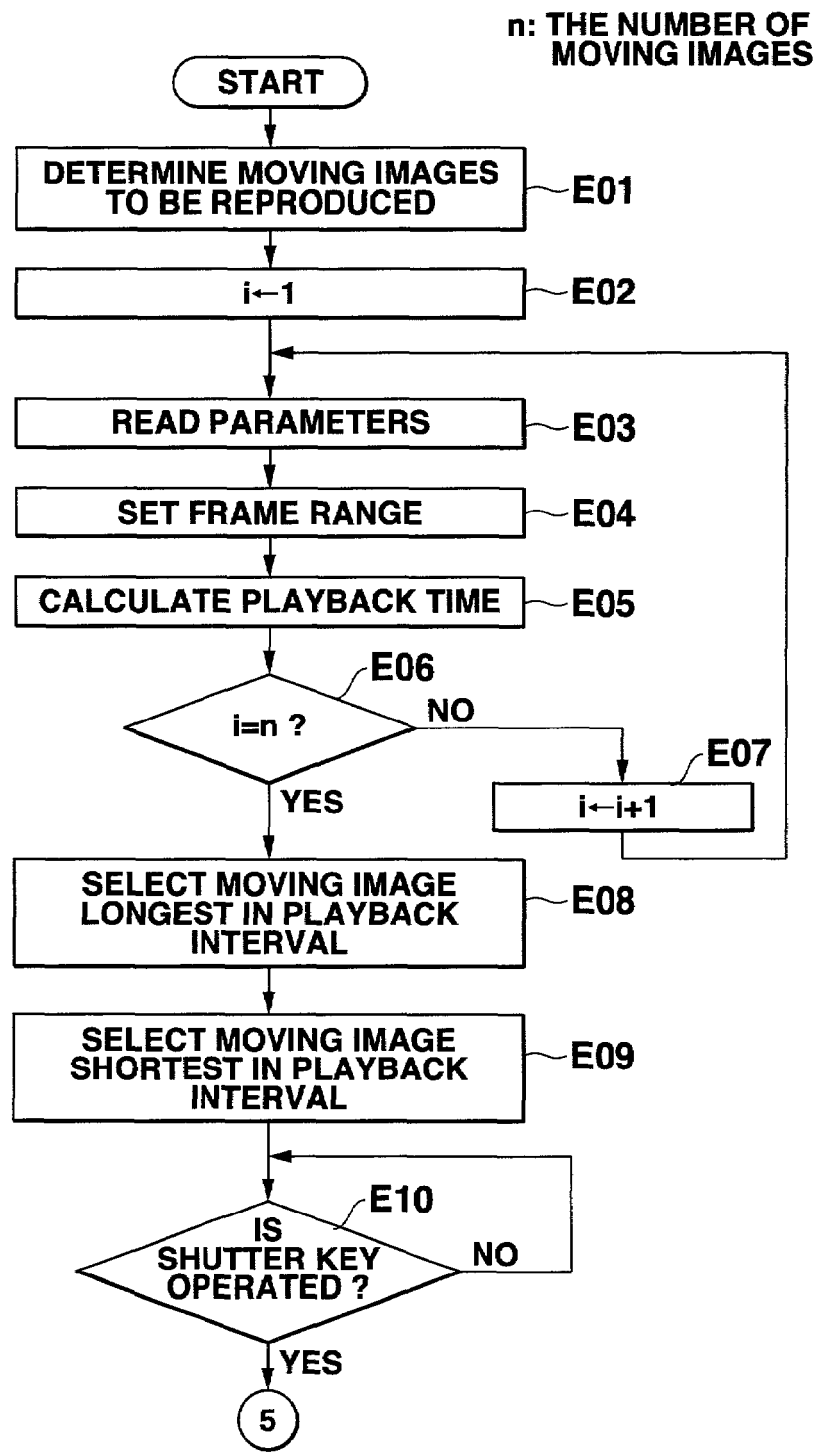
FIGS. 14 and 15 form a flowchart for the processing of reproducing two or more moving images simultaneously in accordance with a fifth embodiment of the present invention.
Figure 15:
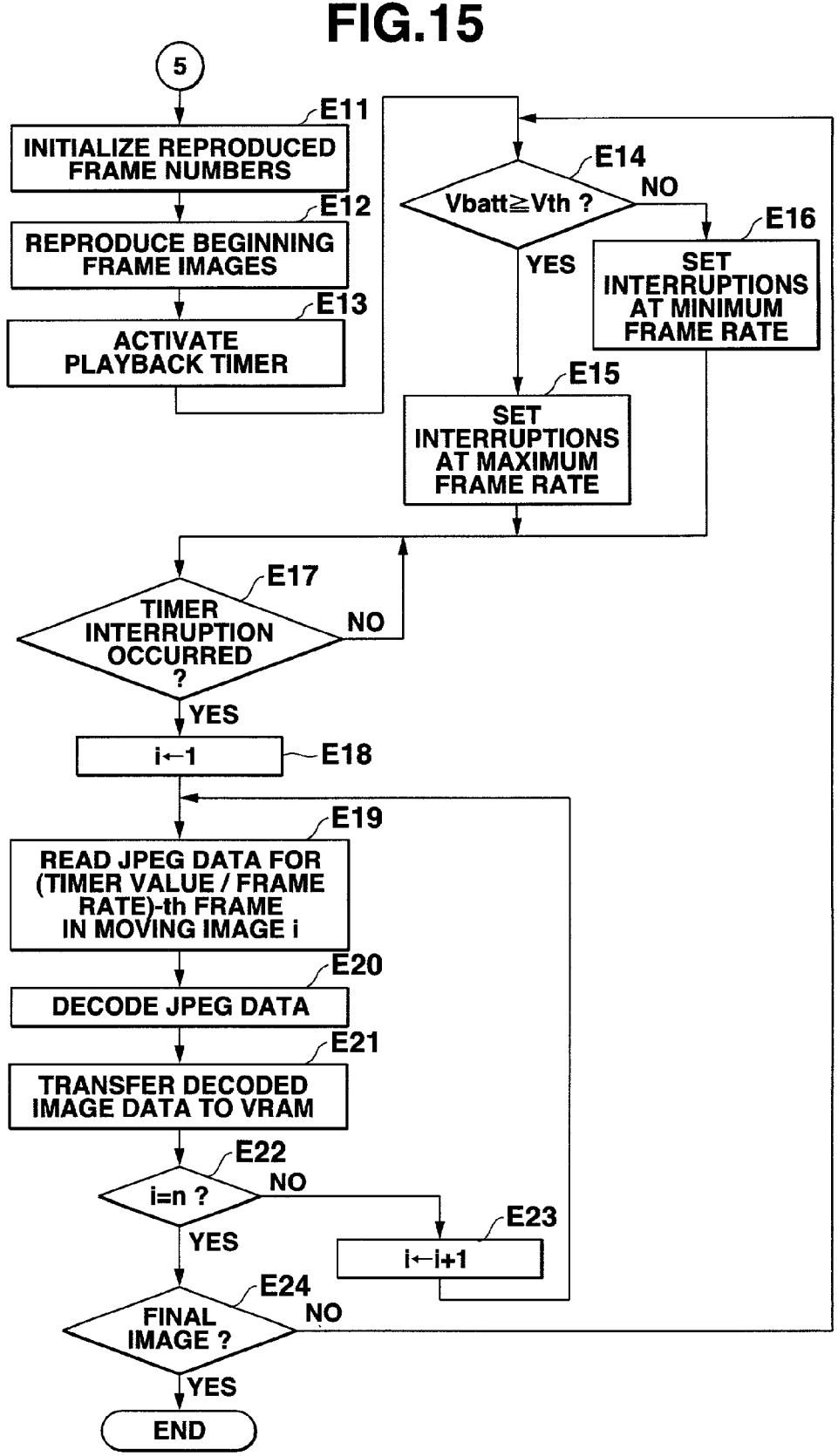

FIGS. 14 and 15 show the processing in the reproduce mode mainly performed by the CPU 21 in reading a plurality of items of moving image data from the flash memory 28 and reproducing them simultaneously in a multi-image display format.

First, an arbitrary number of items of moving image data is selected from moving image data recorded in the flash memory 28 (step E01) and then the number, n, of selected items of moving image data is set.

The CPU 21 then sets the pointer i to moving image data to the initial value "1" (step E02) and reads parameter values associated with the moving image data first selected according to pointer value i=1 (step E03). Specifically, the parameter values are the overall playback time and the frame rate.

Next, to set a frame range over which each moving image data is to be reproduced, the beginning frame number and the ending frame number are specified (step E04). This is done by first displaying a plurality of contiguous frames of still image data constituting an item of moving image data in a multi-image display form on the display unit 25 and then accepting operations of the cursor key and the Enter key in the key entry unit 26 to determine the beginning and ending frames on the display screen.

After the frame range has been set on each moving image data in that manner, the playback time is calculated, in step E05, by playback time=(ending frame number−beginning frame number+1)×frame rate A decision is next made as to whether or not the pointer value i equals the number n of the selected items of moving image data (step E06). If it does not, then the procedure goes to step E07 where the pointer value i is incremented by one. After that, the process is repeated again beginning with step E03.

By carrying out steps E03 through E07 repeatedly, the same processing is performed on each of the selected items of moving image data.

On termination of the processing on all the selected moving image data, the pointer value i is determined in step E06 to be equal to n, the number of selected items of moving image data. After that, the moving image data that is the longest in playback interval, i.e., the lowest in frame rate, is selected (step E08).

In addition, the moving image data that is the shortest in playback interval, i.e., the highest in frame rate, is selected (step E09).

In this manner, the processing as preparation for playback terminates. The CPU waits for the shutter key to be operated in order to start playback (step E10).

When the shutter key is operated (YES in step E10), the CPU sets the frame numbers specified as the beginning frames of the respective moving images as initial values of the numbers of reproduced frames (step E11). After that, still image data corresponding to the frame number is read from the flash memory 28 into the JPEG circuit 27 where it is decoded by decompression which is the reverse of compression at record time and reduced in size for multi-image display. The resulting still image data is sent via the VRAM controller 22 to the VRAM 23 where it is expanded and stored. The video encoder 24 produces a corresponding video signal for multi-image display, which is in turn displayed on the display unit 25. This sequence of processes are repeated from each moving image data (step E12).

In this example, since three moving images are selected (n=3), the screen of the display unit 25 is divided into four (2×2) areas, three of which are used for multi-image display.

Upon start of motion display, the CPU 21 activates the timer (step E13) and then makes a decision of whether or not the supply voltage Vbatt of the battery 29 is greater than or equal to a preset threshold value Vth, i.e., whether or not the battery power has been consumed considerably (step E14).

When Vbatt≧Vth, i.e., when the battery power is sufficient, the CPU sets the playback timer to cause interruptions at the frame rate of the moving image data shortest in playback interval selected in step E09.

On the other hand, when Vbatt<Vth, i.e., when the battery power has been consumed considerably, the CPU sets the playback timer to cause interruptions at the frame rate of the moving image data longest in playback interval selected in step E09.

After the timer has been set in step E15 or E16 to cause interrupt signals at the set time intervals, the CPU waits for an interrupt signal (step E17).

If the decision in step E17 is that an interruption has occurred from the playback timer, then the pointer value i for moving image data is set to the initial value, or one (step E18). The frame number of the moving image 1 first selected according to i=1 is then updated to read corresponding new still image data from the flash memory 28 (step E19).

In this case, the new frame number of still image data to be read is one that is the closest to the result of the arithmetic operation:

count value in playback timer/frame rate of moving image $i$

That is, the frame of new still image data to be read is one whose playback timing is the closest to the timing of playback of the next frame of the moving image which is the shortest or longest in playback interval.

The still image data thus read is decompressed in the JPEG circuit 27 (step E20). Further, the image data is reduced in size for multi-image display and then expanded and stored in the display area corresponding to the moving image 1 in the VRAM 23 (step E21). The displayed frame of the moving image 1 on the multi-image display screen is updated.

Next, upon determining that i is not equal to n (step E22), the pointer value i is incremented by one to two (step E23). The procedure then returns to step E19, whereby the processing is now performed on the moving image 2 to update its displayed frame.

By performing steps E19 to E23 repeatedly, each moving image data has its displayed frame updated to a frame which is the closest in playback timing to the next frame of the moving image data which is the shortest in playback interval.

On determining that i=n in step E22 after the displayed frame of the moving image 3 has been updated, a decision is made as to whether or not that frame of the moving image shortest or longest in playback interval which is being displayed at that time is the final frame within the previously set frame range (step E24). If it is not, that is, if further frame updating is possible, then the procedure returns again to step E14 to wait for the next interrupt signal from the playback timer.

With each interruption from the playback timer, the processing is repeated beginning with step E14. Thereby, the displayed frame of each moving image data on the multi-image screen is updated at the frame rate corresponding to the power consumed state of the battery 29.

When, in step E24, the image being displayed is determined to be the final image within the previously set frame range, that is, there are no more frames to be displayed, the processing of FIGS. 14 and 15 is complete.

Figure 16:
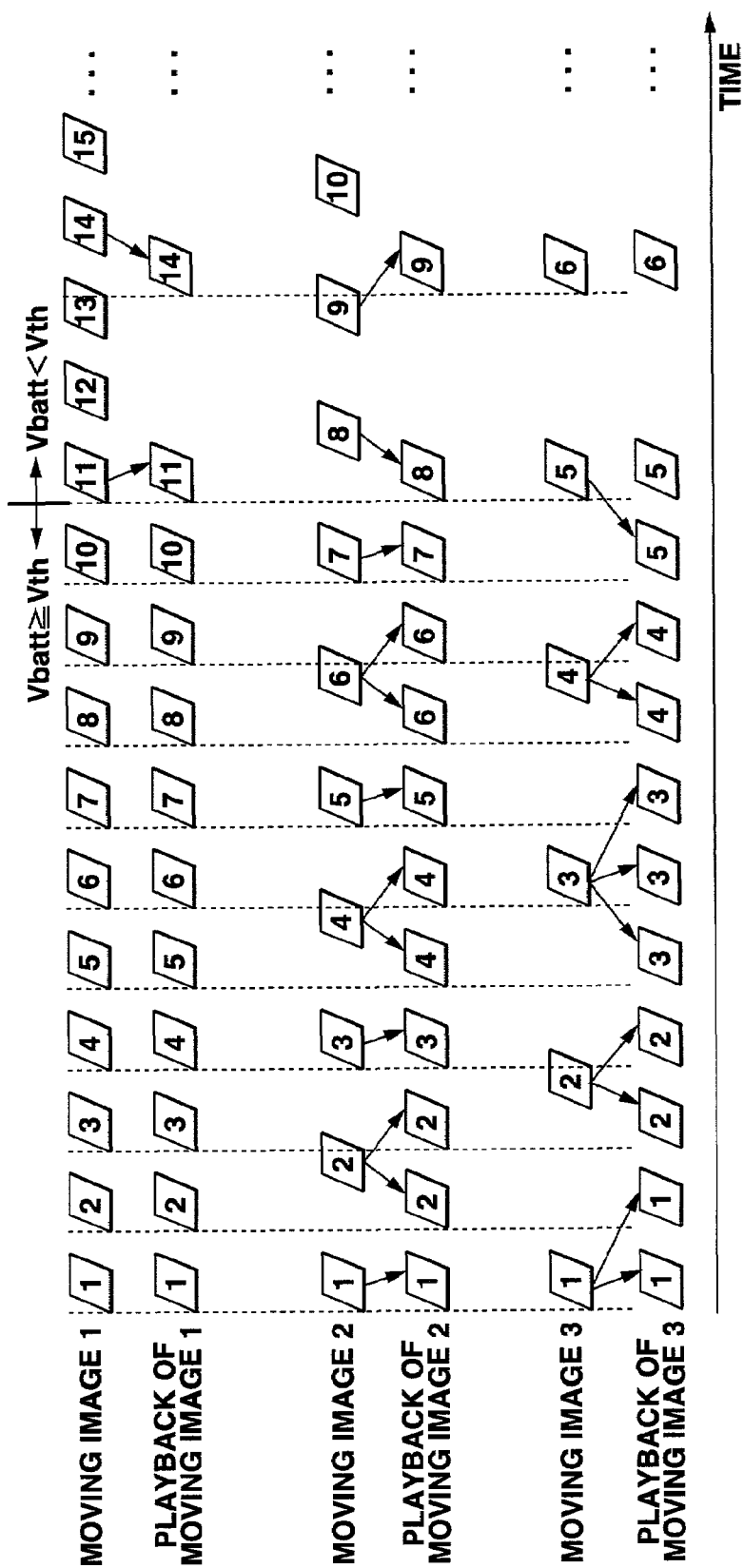
FIG. 16 is a diagram for use in explanation of the way in which three moving images are reproduced simultaneously in accordance with the fifth embodiment of the present invention.

FIG. 16 shows the timing by which the moving images 1, 2 and 3 recorded in the flash memory 28 are reproduced with their first frames as the beginning frames.

In this example, it is assumed that each of the moving images 1, 2 and 3 has a different frame rate and the moving image 1 is the highest in frame rate, i.e., the shortest in the interval at which frames are played back and the moving image 3 is the lowest in frame rate, i.e., the longest in playback interval.

In FIG. 13, the numbers of frames to be reproduced actually in each moving image are shown below the frame sequence in the corresponding moving image data. When Vbatt≧Vth, that is, when the power level of the battery 29 has not fallen, the CPU 21 updates the displayed frames of the moving images 2 and 3 to conform to the frame rate of the moving image 1 that is the shortest in playback interval as in the fourth embodiment.

When the power level of the battery 29 is later decided to have become lower than the predetermined level, the CPU 21 updates the displayed frames of the moving images 1 and 2 to conform to the frame rate of the moving image 3 that is the longest in playback interval as in the third embodiment.

Although, in the fifth embodiment, when the power of the battery 28 is not consumed, the playback interval of the moving images 2 and 3 are made to conform to that of the moving image 1 that is the highest in frame rate and, when the power of the battery is consumed, the playback interval of the moving images 1 and 2 is made to conform to that of the moving image 3 that is the lowest in frame rate, this is not restrictive. It is necessary only that the frame rate to which reference is made when the battery power is consumed be lower than the frame rate to which reference is made when the battery power is not consumed. For example, when the battery power is not consumed, the moving images 1 and 3 (or 2 and 3) may be reproduced to conform to the playback interval of the moving image 2 (or 1). Otherwise, the moving images 1 and 2 (or 1 and 3) may be reproduced to conform to the playback interval of the moving image 3 (or 2).

Further, the playback interval (frame rate) of one of the images 1, 2 and 3 need not necessarily to be made the playback interval for the other images. That is, based on the frame rates of the moving images 1, 2 and 3 the optimum frame rate when the battery power is consumed and the optimum frame rate when the battery power is not consumed may be calculated, each of which is different from those of the moving images. In this case, the moving images are reproduced at either of these optimum frame rates.

SIXTH EMBODIMENT

A sixth embodiment of the present invention will be described hereinafter in terms of a digital camera.

The circuit configuration of the sixth embodiment remains basically unchanged from that shown in FIG. 1. In the sixth embodiment as well, therefore, components corresponding to those in FIG. 1 are denoted by like reference numerals and their illustration and description are omitted.

The first through fifth embodiments have been described on the assumption that, in comparison with the frame rate of moving image data, the time required by the playback processing of reading a frame of still image data from the flash memory 28, decoding it in the JPEG circuit 27, expanding and storing it in the VRAM 23 with reduced size, and reproducing it on the display unit 25 is short enough to allow the next frame to be displayed in time. That is, the circuits used are very fast in processing speed. The sixth embodiment is described in terms of a digital camera that uses circuits low in processing speed.

Figure 17:
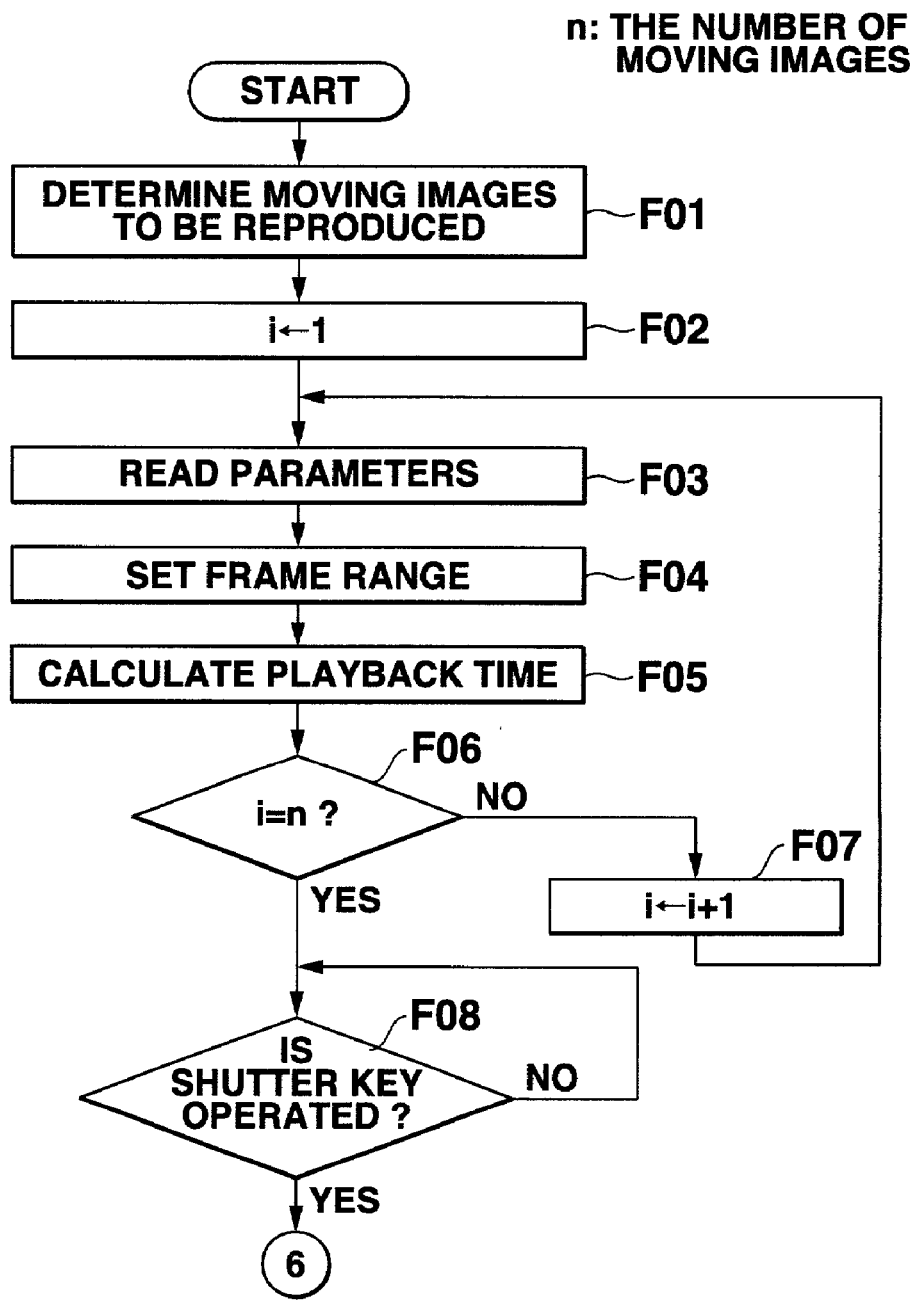
FIGS. 17 and 18 form a flowchart for the processing of reproducing two or more moving images simultaneously in accordance with a sixth embodiment of the present invention.
Figure 18:
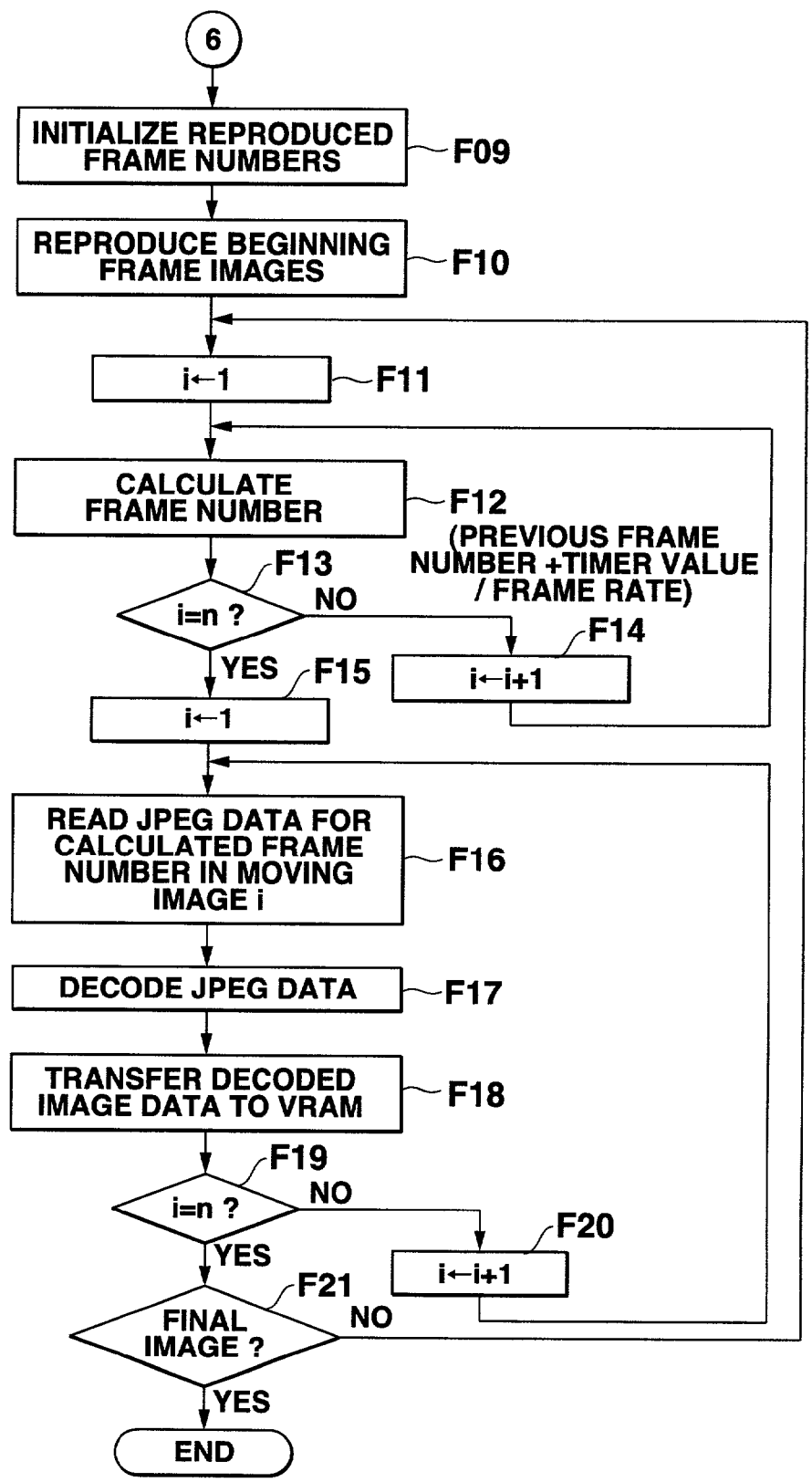

FIGS. 17 and 18 show the processing in the reproduce mode mainly performed by the CPU 21 in reading a plurality of items of moving image data from the flash memory 28 and reproducing them simultaneously in a multi-image display format.

First, an arbitrary number of items of moving image data is selected from moving image data recorded in the flash memory 28 (step F01) and then the number, n, of the selected items of moving image data is set.

The CPU 21 then sets the pointer i to moving image data to the initial value "1" (step F02) and reads parameter values associated with the moving image data first selected according to pointer value i=1 (step F03). Specifically, the parameter values are the overall playback time and the frame rate.

Next, to set a frame range over which each moving image data is to be reproduced, the beginning frame number and the ending frame number are specified (step F04). This is done by first displaying a plurality of contiguous frames of still image data constituting an item of moving image data in a multi-image display form on the display unit 25 and then accepting operations of the cursor key and the Enter key in the key entry unit 26 to determine the beginning and ending frames on the display screen.

After the frame range has been set for each moving image data in that manner, the playback time is calculated, in step F05, by playback time=(ending frame number−beginning frame number+1)×frame rate A decision is next made as to whether or not the pointer value i equals the number n of the selected items of moving image data (step F06). If it does not, then the procedure goes to step F07 where the pointer value i is incremented by one. After that, the process is repeated again beginning with step F03.

By carrying out steps F03 through F07 repeatedly, the same processing is performed on each of the selected items of moving image data.

On termination of the processing on all the selected moving image data, the pointer value i is determined in step F06 to be equal to n, the number of selected items of moving image data, and the processing as preparation for playback terminates. The CPU then waits for operation of the shutter key in order to start playback (step F08).

When the shutter key is operated (YES in step F08), the CPU sets the frame numbers specified as the beginning frames of the respective moving images as initial values of the numbers of reproduced frames (step F09). After that, still image data corresponding to the beginning frame number is read from the flash memory 28 into the JPEG circuit 27 where it is decoded by decompression which is the reverse of compression at record time and reduced in size for multi-image display. The resulting still image data is sent via the VRAM controller 22 to the VRAM 23 where it is expanded and stored. The video encoder 24 produces a corresponding video signal for multi-image display, which is in turn reproduced on the display unit 25. This sequence of processes is performed on each selected moving image data (step F10).

In this example, since three moving images are selected (n=3), the screen of the display unit 25 is divided into four (2×2) areas, three of which are used for multi-image display.

In addition, in step F10, the time required to read three frames of still image data in the moving images 1, 2 and 3 from the flash memory, decode them in the JPEG circuit, transfer and store them in the VRAM and display them on the display unit is counted on the master timer.

Upon completion of display of still image data corresponding to three beginning frames of the moving images 1, 2 and 3, the pointer i is set to one (step F11). After that, the frame number of still image data to be displayed next in the moving image 1 is calculated according to i=1 (step F12).

This calculation is to obtain the number of a frame that is the closest to the next playback time by dividing the time count in the master timer by the frame rate of the moving image 1 and adding the result to the number of the frame that has been displayed so far (on the condition that the count in the master timer (the time required to display three frames of still images in the moving images 1, 2 and 3) is in a synchronous relationship with the frame rate of each of the moving images).

Next, upon determining that i is not equal to n (step F13), the pointer value i is incremented by one to two (step F15). The procedure then returns to step F12, whereby the processing is now performed on the moving image 2 to calculate the frame number of still image data to be displayed next.

By performing steps F12 to F14 repeatedly, the frame number of still image data to be displayed next in each moving image data is calculated in sequence while updating the pointer value i. It is assumed here that the time required by steps F12 to F14 to calculate the frame number is extremely close to zero.

On determining that i=n in step F13 after the calculation of the frame number of the moving image 3, the pointer i is initialized to 1 (step F15). The still image data of the calculated frame number of the moving image 1 first selected according to i=1 is then read from the flash memory 28 (step F16).

The still image data thus read is decompressed in the JPEG circuit 27 (step F17). Further, the image data is reduced in size for multi-image display and then expanded and stored in the corresponding display area to the moving image 1 in the VRAM 23 (step F18). The displayed frame of the moving image 1 on the multi-image display screen is updated.

Next, upon determining that i is not equal to n (step F19), the pointer value i is incremented by one to two (step F20). The procedure then returns to step F16, whereby the processing is now performed on the moving image 2 to update its displayed frame.

By performing steps F16 to F20 repeatedly, each moving image data has its displayed image data updated to still image data corresponding to the calculated frame number in sequence while updating the pointer value i.

On determining that i=n in step F19 after the displayed frame of the moving image 3 has been updated, a decision is made as to whether or not that frame of the moving image which is being displayed at that time is the final frame within the previously set frame range (step F21). If it is not, that is, if further frame updating is possible, then the procedure returns again to step F11 to calculate the frame number of still image data to be reproduced next.

By repeating the processing beginning with step F11, two or more items of moving image data are displayed in a multi-image format in real time taking into consideration the processing time required to read reading still image data from the flash memory 28, storing it in the VRAM 23, and reproducing it on the display unit 25.

When, in step E24, the image being displayed is determined to be the final image within the previously set frame range, that is, there are no more frames to be displayed, the processing of FIGS. 17 and 18 is complete.

FIG. 19 shows the timing by which the moving images 1, 2 and 3 recorded in the flash memory 28 are reproduced with their first frames as the beginning frames of the reproduced frame ranges.

In this example, it is assumed that each of the moving images 1, 2 and 3 has a different frame rate and the moving image 1 is the highest in frame rate, i.e., the shortest in the interval at which frames are played back and the moving image 3 is the lowest in frame rate, i.e., the longest in playback interval.

In FIG. 19, below the frame sequence of each moving image data, the processing timing is shown by which a frame of still image data is read from the flash memory 28, decoded in the JPEG circuit 27, transferred to the VRAM 23 with reduction in data size, and displayed on the display unit 25. For each moving image, the frame number to be reproduced next is calculated to suit the aforementioned processing time, thereby allowing two or more moving images to be simultaneously displayed in real time.

Although the first through six embodiments of the invention have been described in terms of a digital camera, the principles of the invention are also applicable to other devices, such as a personal computer, a personal digital assistant (PDA), a cellular phone, a television receiver, an electronic album device, etc., provided that they can accommodate a flash memory in which moving images have been recorded by the digital camera to allow two or more moving images to be reproduced in a multi-image display format.

What is claimed is:

1. A moving image reproducing device comprising:
   moving image recording means for recording a plurality of items of moving image data, wherein a frame rate for recording each item of moving image data is set to a time interval for reproducing, in order, each frame image of the item of moving image data;
   selecting means for arbitrarily selecting a plurality of the recorded items of moving image data to be simultaneously reproduced;
   detecting means for detecting a power consumed state of a battery that is a power source for the device;
   determining means for, when at least one of the respective frame rates of the selected items of moving image data is different from the other frame rates, determining a common frame rate based on a result of the detection by the detecting means for reproducing the plurality of selected items of moving image data; and
   reproducing control means for simultaneously reproducing the plurality of selected items of moving image data at the common frame rate;
   wherein the reproducing control means selects, for at least one of the plurality of selected items of moving image data, a frame image of the at least one item of moving image data to be reproduced at each reproducing timing based on a difference between the respective frame rate of the at least one item of moving image data and the common frame rate.

2. The moving image reproducing device according to claim 1, wherein the determining means determines, as the common frame rate, one of the respective frame rates of the selected items of moving image data.

3. The moving image reproducing device according to claim 2, wherein the determining means determines, as the common frame rate, a highest frame rate of the respective frame rates of the selected items of moving image data.

4. The moving image reproducing device according to claim 2, wherein the determining means determines, as the common frame rate, a lowest frame rate of the respective frame rates of the selected items of moving image data.

5. The moving image reproducing device according to claim 1, wherein, for the at least one item of moving image data, the reproducing control means selects a same frame image to be displayed at a plurality of said reproducing timings so as to be repeatedly displayed, when the respective frame rate of the at least one item of moving image data is lower than the common frame rate.

6. The moving image reproducing device according to claim 1, wherein, for the at least one item of moving image data, the reproducing control means selects the frame image to be reproduced at each said reproducing timing such that frame images of the at least one item of moving image data are selectively discarded, when the respective frame rate of the at least one item of moving image data is higher than the common frame rate.

7. The moving image reproducing device according to claim 1, wherein the moving image reproducing device is portable.

8. The moving image reproducing device according to claim 1, wherein the determining means determines a higher frame rate as the common frame rate during a low power consumed state of the battery, and determines a lower frame rate as the common frame rate during a high power consumed state of the battery.

9. The moving image reproducing device according to claim 1, further comprising a moving image capture section for capturing an image of a moving subject to output moving image data, wherein a memory means records the moving image data output from the moving image capture section.

10. A moving image reproducing method for controlling a moving image reproducing apparatus, wherein the moving image reproducing apparatus comprises moving image recording means for recording a plurality of items of moving image data, wherein a frame rate for recording each item of moving image data is set to a time interval for reproducing, in order, each frame image of the item of moving image data, said method comprising:
   arbitrarily selecting a plurality of the recorded items of moving image data to be reproduced simultaneously;
   detecting a power consumed state of a battery that is a power source for the moving image reproducing apparatus;
   determining based on a result of the detection of the power consumed state, when at least one of the respective frame rates of the selected items of moving image data is different from the other frame rates, a common frame rate for reproducing the plurality of selected items of moving image data; and
   simultaneously reproducing the plurality of selected items of moving image data at the common frame rate;
   wherein the simultaneous reproduction includes selecting, for at least one of the plurality of selected items of moving image data, a frame image of the at least one item of moving image data to be reproduced at each reproducing timing based on a difference between the respective frame rate of the at least one item of moving image data and the common frame rate.

* * * * *